United States Patent
Ito et al.

(10) Patent No.: US 6,430,292 B1
(45) Date of Patent: *Aug. 6, 2002

(54) SYSTEM AND METHOD FOR CONTROLLING DISCLOSURE TIME OF INFORMATION

(75) Inventors: Hiromichi Ito; Masato Arai, both of Yokohama (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,144

(22) Filed: Jul. 6, 1998

(30) Foreign Application Priority Data

Jul. 7, 1997 (JP) .............................. 9-181186

(51) Int. Cl.⁷ ............................... H04L 9/00

(52) U.S. Cl. ................. 380/280; 380/277; 380/278; 380/279

(58) Field of Search ............... 380/277–280; 725/31; 705/51, 54

(56) References Cited

U.S. PATENT DOCUMENTS

| | | | | |
|---|---|---|---|---|
| 5,249,230 A | * | 9/1993 | Mihm, Jr. | 380/249 |
| 5,319,705 A | * | 6/1994 | Halter et al. | 705/54 |
| 5,392,351 A | * | 2/1995 | Hasebe et al. | 705/51 |
| 5,594,794 A | * | 1/1997 | Eyer et al. | 380/231 |
| 5,640,453 A | * | 6/1997 | Schuchman et al. | 380/211 |
| 5,706,348 A | * | 1/1998 | Gray et al. | 713/160 |
| 5,889,861 A | * | 3/1999 | Ohashi et al. | 380/247 |
| 6,029,045 A | * | 2/2000 | Picco et al. | 455/5.1 |
| 6,144,401 A | * | 11/2000 | Casement et al. | 725/93 |
| 6,157,723 A | * | 12/2000 | Schultz | 380/273 |

FOREIGN PATENT DOCUMENTS

JP    8102735    4/1996

OTHER PUBLICATIONS

E. Okamoto, Angio Riron Nyuumon, "An Introduction of the Theory of Cryptography", pp. 11–112, Kyoritsu Syuppan Kabushiki Kaisay, Feb. 25, 1993.

* cited by examiner

*Primary Examiner*—Albert Decady
*Assistant Examiner*—Steve Kabakoff
(74) *Attorney, Agent, or Firm*—Antonelli, Terry, Stout & Kraus, LLP

(57) ABSTRACT

A key managing system for implementing simultaneous disclosure of information. The invention includes an information transmitting apparatus which transmits a date and time at which secrecy protection of information is ended to a key controlling apparatus. The key controlling apparatus searches a key control table indicating a relation between decryption keys and decryption key disclosure dates & times for an encryption key that forms a pair in conjunction with a decryption key associated with the date & time transmitted by the information transmitting apparatus. The key controlling apparatus then transmits an encryption key found in the search to the information transmitting apparatus. The key controlling apparatus also discloses a decryption key for the present date & time to an information receiving apparatus in response to a request for a decryption key at a present date and time. The information transmitting apparatus, upon receipt of the encryption key, encrypts information by using the encryption key and then transmits the encrypted information to the information receiving apparatus. The date and time, at which secrecy protection of information is ended is appended to the encrypted information. The information receiving apparatus, upon the present date and time becoming coincident with the date and time appended to the received encrypted information, acquires a disclosed decryption key and decrypts the encrypted information by using the decryption key.

29 Claims, 12 Drawing Sheets

FIG. 2

KEY CONTROL TABLE

| DATA & TIME | ENCRYPTION KEY | | DECRYPTION KEY | |
|---|---|---|---|---|
| | e | n | d | n |
| 199701010000 | 8F04 | 1AB3B----F3CB | F7C3B----935B | 1AB3B----F3CB |
| 199701010100 | 169B | D5499----1CB6 | 6056D----7E9C | D5499----1CB6 |
| 199701010200 | EE7C | CB69B----5FC8 | 413A6----F103 | CB69B----5FC8 |
| 199912312100 | 8BD7 | B1B00----912F | 36A9B----DF83 | B1B00----912F |
| 199912312200 | A29F | AB39B----55FD | D0923----14F3 | AB39B----55FD |
| 199912312300 | 4623 | 08469----EC01 | CC08E----9FCB | 08469----EC01 |

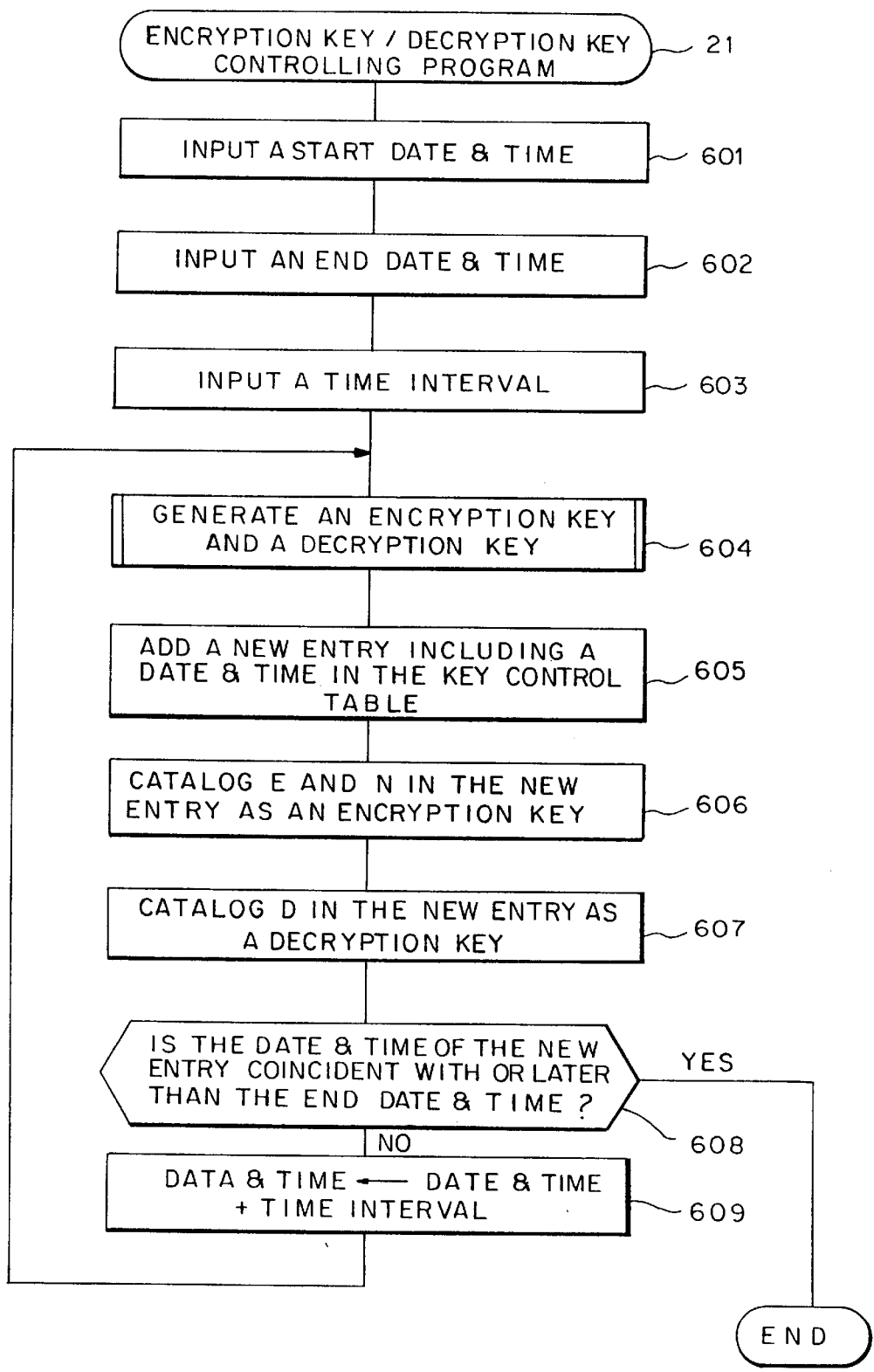

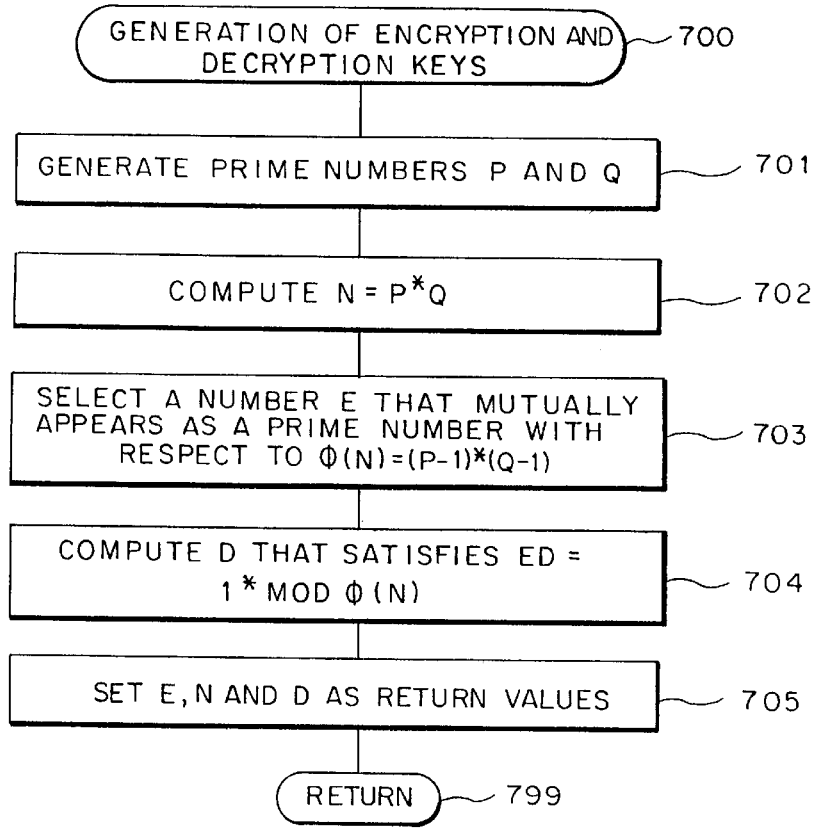
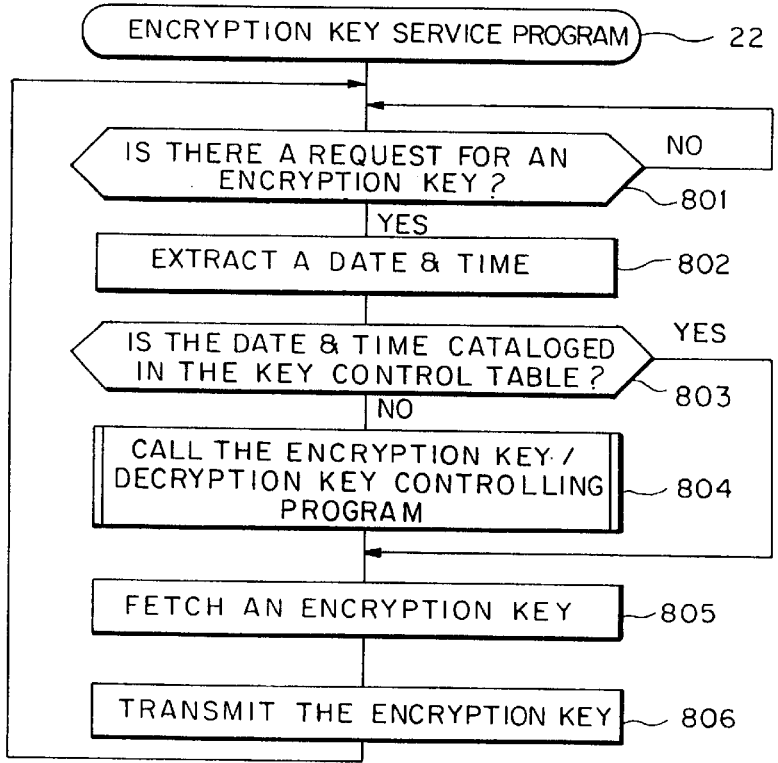

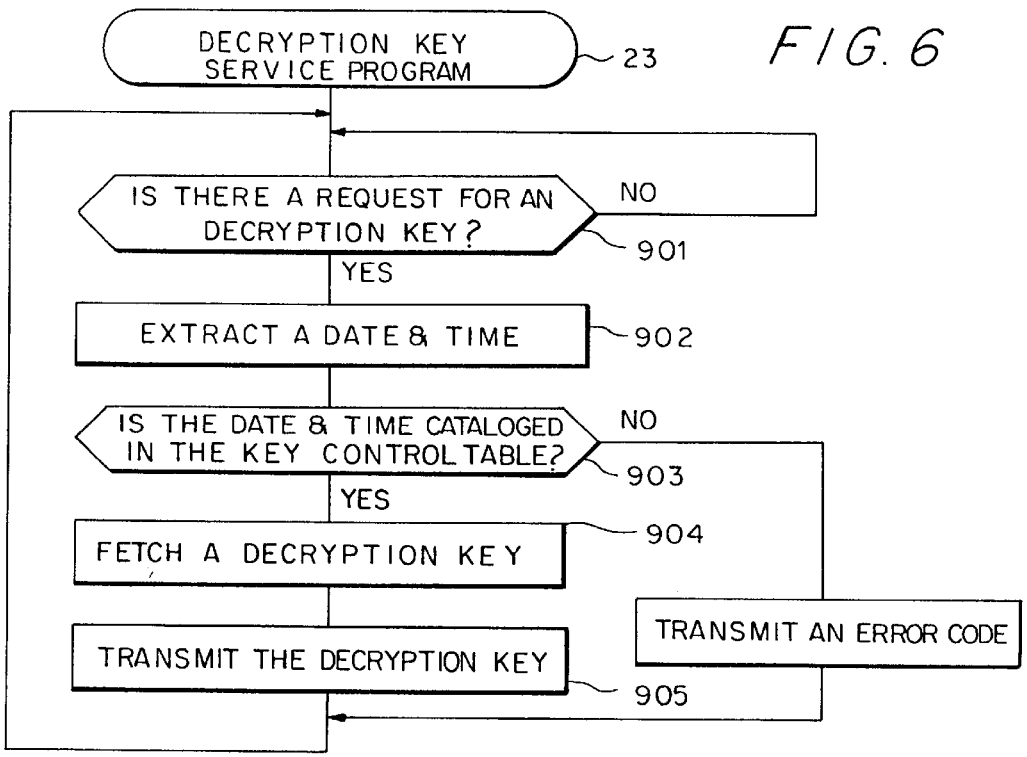
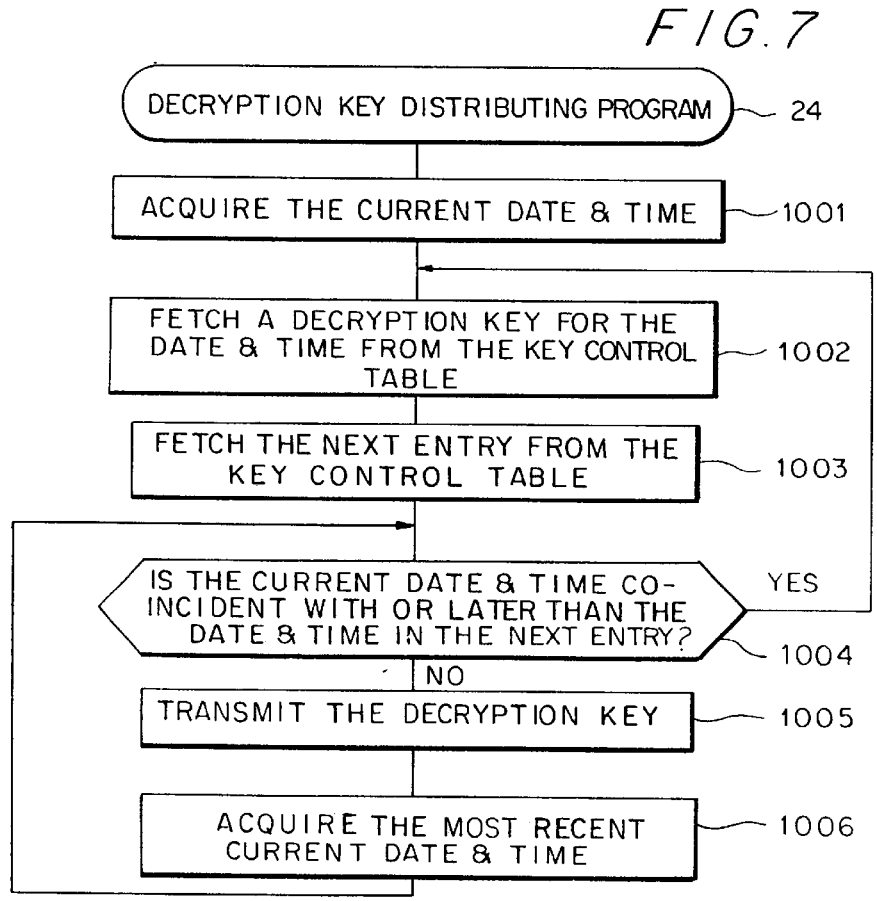

| | |
|---|---|
| | ⋮ |
| 1997/01/01 00:00 | 1997010100:00 F7C3B --- 935B |
| | 1997010100:00 F7C3B --- 935B |
| | 1997010100:00 F7C3B --- 935B |
| 1997/01/01 01:00 | 1997010100:00 F7C3B --- 935B |
| | 199701010100 6056D --- 7E9C |
| | 199701010100 6056D --- 7E9C |
| | 199701010100 6056D --- 7E9C |
| 1997/01/01 02:00 | 199701010100 6056D --- 7E9C |
| | 199701010200 413A6 --- F103 |
| | 199701010200 413A6 --- F103 |
| | 199701010200 413A6 --- F103 |
| | ⋮ |

A CHRONOLOGICAL LIST OF DISCLOSURE OF DECRYPTION KEYS

FIG. 14

| Time | Channel 1 | Channel 2 | Channel 3 |
|---|---|---|---|
| 1997/01/01 00:00 | 19970101 0000 F7C3B---935B<br>19970101 0000 F7C3B---935B<br>19970101 0000 F7C3B---935B | | |
| 1997/01/01 01:00 | | 19970101 0100 6056D---7E9C<br>19970101 0100 6056D---7E9C<br>19970101 0100 6056D---7E9C | |
| 1997/01/01 02:00 | | | 19970101 0200 413A6---F103<br>19970101 0200 413A6---F103<br>19970101 0200 413A6---F103 |
| 1997/01/01 03:00 | 19970101 0000 F7C3B---935B | | |
| 1997/01/01 04:00 | | 19970101 0100 6056D---7E9C | 19970101 0200 413A6---F103 |

A CHRONOLOGICAL LIST OF DISCLOSURE OF DECRYPTION KEYS

SYSTEM AND METHOD FOR CONTROLLING DISCLOSURE TIME OF INFORMATION

BACKGROUND OF THE INVENTION

The present invention relates to a system for controlling decryption keys used for decrypting encrypted data. More particularly, the present invention relates to a system for controlling decryption keys used for decrypting encrypted data in a manner to permit disclosure of information to a plurality of users on a communication network at the same time.

In recent years, information can be readily exchanged among a plurality of terminals by way of a communication network such as the Internet. Among data to be exchanged, there is a kind of information with a property which requires that the information be kept secret up to a predetermined time at a predetermined date but be set free for disclosure afterward. An example of such information is confidential data of the government. In addition, such information is to be disclosed to a plurality of users after the predetermined time at the predetermined date. In other words, there must be an assurance that information can be put in a state that allows a plurality of users to know the most essential part of the information. An example of information with such a property is information on a transaction such as a tender or an offer.

For such information, there has been provided a conventional method whereby information produced at a terminal of an information producer is kept at the terminal up to a date or a time of a date at which protection of the confidentiality of the information is ended. It is not until the termination of the confidentiality protection is ended, that is, the expiration of the time of the confidentiality protection, that the information is disclosed and distributed to a plurality of users.

With the method described above, however, it is not easy for an information producer to disclose or distribute information to a plurality of users at the same time with a high degree of reliability. Particularly if the amount of the information to be disclosed or distributed is large or if there are a large number of users on the distribution list.

In addition, the information producer has to control the date & time at which information is to be disclosed or distributed. In particular, if there are many kinds of information to be disclosed or distributed at the same date & time, it will be difficult to assure that these pieces of information will be disclosed or distributed to a plurality of users simultaneously.

SUMMARY OF THE INVENTION

An object of the present invention to provide a system for conducting decryption keys used for decrypting encrypted data in a manner to permit simultaneous disclosure of information to a plurality of users on a network.

The present invention provides a key arrangement system including an information encrypting apparatus for encrypting information by using encryption keys, an information decrypting apparatus for decrypting information by using decryption keys, a key controlling apparatus for controlling the encryption keys and the decryption keys used in the information encrypting apparatus and the information decrypting apparatus respectively, and a communication network connected at least between the information encrypting apparatus and the key controlling apparatus.

The key controlling apparatus includes a key storage for storing at least a pair of the encryption and decryption keys, a key control table storage for storing a key control table illustrating a relation between the decryption keys stored in the key storage and disclosure dates or disclosure dates & times of the decryption keys, a key searching apparatus for searching the key control table stored in the key control table storage for one of the decryption keys associated with one of the disclosure dates or disclosure dates & times specified by the information encrypting apparatus and one of the encryption keys forming a pair in conjunction with the decryption key, an encryption key transmitting apparatus for transmitting the encryption key searched for by the key searching apparatus to the information encrypting apparatus through the communication network, and a decryption key disclosing apparatus for disclosing one of the decryption keys associated with the present date or the present date & time according to the relation shown by the key control table stored in the key control table storage.

The information encrypting apparatus includes a date/date & time information transmitting apparatus for transmitting data representing a date or a date & time at which security protection of data to be encrypted will be ended to the key controlling apparatus through the communication network, an encryption key acquiring apparatus for acquiring one of the encryption keys which is transmitted by the key controlling apparatus through the communication network and forms a pair in conjunction with one of the decryption keys associated with a disclosure date or a disclosure date & time indicated by the data used for representing a disclosure date or a disclosure date & time and transmitted by the date/date & time information transmitting apparatus, a data encrypting apparatus for encrypting data by using the encryption key acquired by the encryption key acquiring apparatus, and an encrypted information forming apparatus for forming encrypted information to be transmitted to the information decrypting apparatus by adding the data representing a date or a date & time, at which secrecy protection of the encrypted data is to be ended, to the data encrypted by the data encrypting apparatus.

The information decrypting apparatus includes encrypted information acquiring apparatus for acquiring the encrypted information formed by the information encrypting apparatus, a decryption key acquiring apparatus for acquiring one of the decryption keys disclosed by the key controlling apparatus at a disclosure date or a disclosure date & time indicated by the data used for representing a disclosure date or a disclosure date & time and included in the encrypted information acquired by the encrypted information acquiring apparatus, and an information decrypting apparatus for decrypting the encrypted data included in the encrypted information acquired by the encrypted information acquiring apparatus by using the decryption key acquired by the decryption key acquiring apparatus.

The encryption key and the decryption key are a disclosed key and a secret key respectively in a key based encryption system. In the configuration provided by the present invention as described above, the information producer is capable of encrypting information produced thereby using the encryption key. The encrypted information is distributed to information users prior to a date or a date & time at which secrecy protection of the information is ended. It is thus no longer necessary for the information producer to control the disclosure date of information produced thereby.

It is not until a date or a date & time at which secrecy protection of encrypted information received by the information user is ended that the information user is allowed to acquire a decryption key for decrypting the encrypted information. As a result, the encrypted information can be kept secret until the date or the date & time at which the secrecy protection of the encrypted information is ended.

In addition, since the information user is allowed to acquire a decryption key for decrypting encrypted information after a date and time at which secrecy protection of the encrypted information received by the information user is ended, the information user is capable of decrypting the encrypted information received prior to the set date and time by using the decryption key. As a result, if there are a plurality of information users, disclosure of encrypted information at the same time can be assured.

It should be noted that, according to the present invention, if there are a plurality of information decrypting apparatuses, the information decrypting apparatuses are each connected to the key controlling apparatus through the communication network. In this case, the decryption key disclosing apparatus employed in the key controlling apparatus is then capable of simultaneously transmitting a decryption key to the information decrypting apparatuses at the same time by way of the communication network as a broadcast packet or a multi-cast packet. As an alternative, the decryption key disclosing apparatus employed in the key controlling apparatus may disclose a decryption key to the information decrypting apparatuses by adopting a radio broadcasting method. In this case, it is not necessary anymore to connect the information decrypting apparatuses to the key controlling apparatus by using the communication network.

Further, according to the present invention, a decryption key associated with a disclosure date or a disclosure date and time specified by the information encrypting apparatus and transmitted to the key controlling apparatus may not exist in the key control table stored in the key control table storage employed in the key controlling apparatus. In order to cope with such a case, the key control apparatus can be further provided with a key generating apparatus for generating a new pair of encryption and decryption keys, and a key control table creating apparatus for associating the new pair of encryption and decryption keys generated by the key generating apparatus with the disclosure date and time specified by the information encrypting apparatus and transmitted to the key controlling apparatus as well as for adding the new pair and the disclosure date and time to the key control table.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 2 is a diagram illustrating an example of a key control table stored in a magnetic disc of a key controlling apparatus;

FIG. 3 illustrates a flowchart used for explaining operations which are carried out in the key controlling apparatus when an encryption key/decryption key controller program is executed;

FIG. 4 is a flowchart used for explaining operations which are carried out when an encryption key/decryption key generating routine of the encryption key/decryption key controlling program is executed;

FIG. 5 illustrates a flowchart used for explaining operations which are carried out in the key controlling apparatus when an encryption key service program is executed;

FIG. 6 illustrates a flowchart used for explaining operations which are carried out in the key controlling apparatus upon a decryption key service program is executed;

FIG. 7 illustrates a flowchart used for explaining operations which are carried out in the key controlling apparatus when a decryption key distributing program is executed;

FIG. 14 is a diagram illustrating an example of a chronological list of disclosure of decryption keys transmitted from the key controlling apparatus using a plurality of channels.

DETAILED DESCRIPTION OF THE PREFERRED EMBODIMENTS

Figure 1:
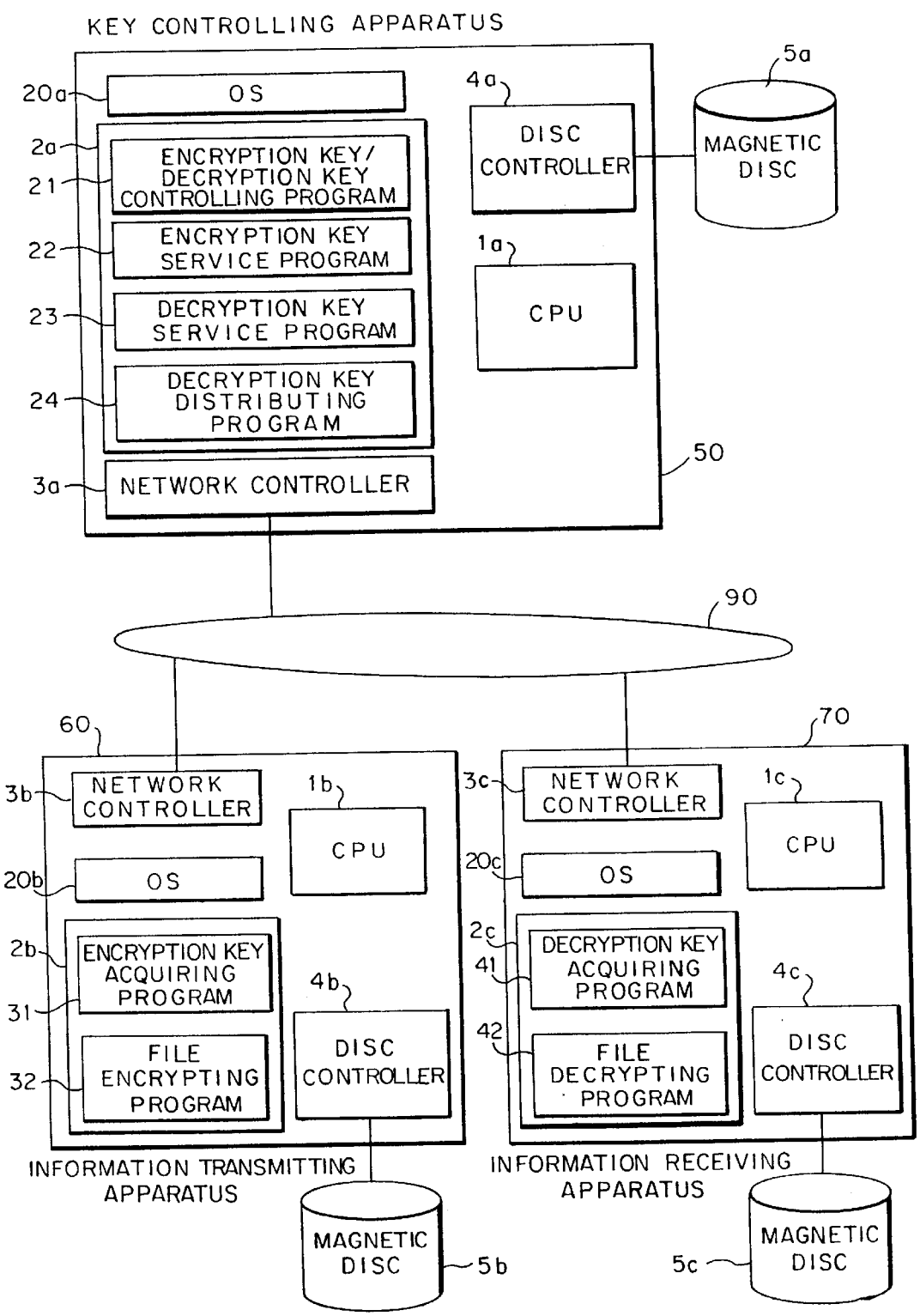
FIG. 1 is a diagram illustrating an overall configuration of a key management system of the present invention.

Embodiments according to the present invention will be described below referring to the drawings.

FIG. 1 is a diagram illustrating an overall configuration of a key controlling system as implemented by an embodiment of the present invention.

In FIG. 1, reference numerals 50 and 60 denote a key controlling apparatus and an information transmitting apparatus respectively. Reference numeral 70 is an information receiving apparatus. The key controlling apparatus 50, the information transmitting apparatus 60 and the information receiving apparatus 70 are connected to each other by a communication network 90 such as a LAN (Local Area Network).

It should be noted that, while only one information transmitting apparatus 60 and only one information receiving apparatus 70 are shown in FIG. 1, the scope of the present invention is not limited to such an example. That is, a plurality of information transmitting apparatuses 60 as well as a plurality of information receiving apparatuses 70 can be connected to the communication network 90.

The key controlling apparatus 50, the information transmitting apparatus 60 and the information receiving apparatus 70 illustrated in FIG. 1 are each an information processing apparatus having a communication function. Such an information processing apparatus can typically be implemented by a PC (personal computer).

The key controlling apparatus 50 has a function of managing encryption keys used in information encryption processing and decryption keys used in information decryption processing. This function is implemented by execution of an encryption key/decryption key controlling program 21, an encryption key service program 22, a decryption key service program 23 and a decryption key distributing program 24 which are loaded into a memory unit 2a from a magnetic disc 5a by a CPU 1a by way of a disc controller 4a. It should be noted that, in FIG. 1, reference numeral 20a denotes an operating system (OS) while reference numeral 3a denotes a network controller for implementing communication through the communication network 90. (The OS maybe of any type such as WINDOWS (registered) trademark of Microsoft Corp.).

In addition to the OS 20a, the encryption key/decryption key controlling program 21, an encryption key service program 22, a decryption key service program 23 and a decryption key distributing program 24, at least a pair of encryption and decryption keys is recorded in the magnetic disc 5a. Each pair of encryption and decryption keys is associated with a decryption key disclosure date or a decryption key disclosure date and time, at which the decryption key in the pair is to be distributed, and a set of information comprising the pair and the decryption key disclosure date or the decryption key disclosure date and time is recorded as an entry in a key control table 100.

An example of the key control table 100 is illustrated in FIG. 2. As shown in FIG. 2, a plurality of pairs recorded on the magnetic disc 5a each comprise an encryption key 102 and a decryption key 103 which are associated with a decryption key disclosure date or a decryption key disclosure date and time 101 at which the decryption key 103 in the pair is to be distributed.

Here, the encryption key 102 and the decryption key 103 are a disclosed key and a secret key respectively in a disclosed key based encryption system. A disclosed key and a secret key in a disclosed key based encryption system have properties that it is very difficult to find a disclosed key of the disclosed key based encryption system from a secret key thereof and, by the same token, it is also very difficult to find a secret key of the disclosed key based encryption system from a disclosed key thereof. For this reason, in the disclosed key based encryption system, instead of being kept secret, a disclosed key for encrypting information is disclosed and only a secret key is kept confidential. That is, any user is capable of acquiring a disclosed key which is disclosed and encrypting information using the disclosed key. However, it is only a user owning a secret key forming a pair in conjunction with a disclosed key used for encrypting information who is capable of decrypting the encrypted information. As a result, secrecy of information transmitted through the communication network can be protected.

A disclosed key and a secret key in a disclosed key based encryption system are implemented by using a one directional function by which, in spite of the fact that it is easy to derive a result from an initial value, it is very difficult to find an initial value from a result. The following is a simple explanation of a so-called RSA (Rivest, Shamir and Adleman) system, a system used widely at the present time.

First of all, two large prime numbers p and q are provided. Then, a product n of the prime numbers p and q is computed. Euler's function of n is defined as follows:

$$\phi(n)=(p-1)\times(q-1)$$

Subsequently, a number e that mutually appears as a prime number with respect to Euler's function of n is selected. Let d be the reciprocal of the number e with respect to the 2 modulo of $\phi$ (n), Euler's function of n. Thus, the reciprocal d can be found from a relation equating the product ed with the modulo of Euler's function of $\phi$ (n) given as follows:

$$ed=1\times\mathrm{mod}\phi(n).$$

Then, by using the quantities e, d and n defined above, a decrypted value (that is, an original value) M and an encrypted value C can be proven to satisfy the following equations:

$$C=(M^e)\mathrm{mod}\ n$$

$$M=(C^d)\mathrm{mod}\ n$$

As a result, the reciprocal d can be used as a secret key while a pair of e and n can be used as a disclosed key. A symbol e denoted by reference numeral 112 and a symbol n denoted by reference numeral 122 shown in FIG. 2 are the number e and the product n used in the above equations respectively. Further, a symbol d denoted by reference number 132 illustrating in FIG. 2 is the reciprocal d used in the above equations.

The disclosed key based encryption system is described in detail in documents such as "A Study of Data Protection and Encryption," by Shin Ichimatsu Nihon Keizai Shinbun 1983.

The information transmitting apparatus 60 has a function of encrypting information. The information encrypting function is implemented by a CPU 1b through execution of an encryption key acquiring program 31 and a file encrypting program 32 which are loaded from a magnetic disc 5b into a memory unit 2b by way of a disc controller 4b. It should be noted that, in FIG. 1, reference numeral 20b denotes an operating system (OS) while reference numeral 3b denotes a network controller for implementing communication through the communication network 90. (The OS maybe of any type such as WINDOWS (registered) trademark of Microsoft Corp.).

The information receiving apparatus 70 has a function of decrypting information. The information decrypting function is implemented by a CPU 1c through execution of a decryption key acquiring program 41 and a file decrypting program 42 which are loaded from a magnetic disc 5c into a memory unit 2c by way of a disc controller 4c. In FIG. 1, reference numeral 20c denotes an operating system (OS) while reference numeral 3c denotes a network controller for implementing communication through the communication network 90. (The OS maybe of any type such as WINDOWS (registered) trademark of Microsoft Corp.). Each of the above-described programs can be implemented in any number of different programming language such as C++, JAVA, BASIK, etc.

The operation of the key managing system with a configuration described above is explained briefly as follows.

First, the information transmitting apparatus 60 transmits information on a decryption key disclosure date or a decryption key disclosure date and time, at which the secrecy protection of information to be encrypted will be ended, to the key controlling apparatus 50 by way of the communication network 90.

Receiving the information from the information transmitting apparatus 60, the key controlling apparatus 50 searches the key control table 100 stored on the magnetic disc 5*a* for an encryption key associated with a decryption key disclosure date or a decryption key disclosure date and time indicated by the information. The key controlling apparatus 50 then transmits the encryption key to the information transmitting apparatus 60 by way of the communication network 90.

The key controlling apparatus 50 also has a function to read out a decryption key associated with the present date or the present date and time from the key control table 100 stored on the magnetic disc 5*a* and disclose the decryption key to the information receiving apparatus 70. By executing this function, the key controlling apparatus 50 sequentially reads out and discloses decryption keys one after another as time goes by.

The information transmitting apparatus 60 encrypts data to be transmitted to the information receiving apparatus 70 by using the encryption key received from the key controlling apparatus 50. Then, information on the date or the date and time at which the secrecy protection of the encrypted information is to be ended is added to the encrypted data to form encrypted information before transmitting the encrypted information to the information receiving apparatus 70 by way of the communication network 90.

Receiving the encrypted information from the information transmitting apparatus 60, the information receiving apparatus 70 waits until the current date or the current date and time becomes coincident with the date or the date and time indicated by the information included in the encrypted information. As the current date or the current date and time becomes coincident with the date or the date and time indicated by the information included in the encrypted information, the information receiving apparatus 70 acquires a decryption key disclosed by the key controlling apparatus 50. Then, the encrypted data received from the information transmitting apparatus 60 is decrypted by using the decryption key acquired from the key controlling apparatus 50.

Next, the configuration of each of the key controlling apparatus 50, the information transmitting apparatus 60 and the information receiving apparatus 70 included in the key managing system implemented by the present embodiment is described in detail as follows:

First, the key controlling apparatus 50 is explained in detail below.

The explanation begins with description of operations which are carried out in the key controlling apparatus 50 when the CPU 1*a* executes the encryption key/decryption key controlling program 21 loaded into the memory unit 2*a*.

FIG. 3 illustrates a flowchart used for explaining the operations which are carried out in the key controlling apparatus 50 when the CPU 1*a* executes the encryption key/decryption key controlling program 21 loaded into the memory unit 2*a*.

First, equipment such as a display unit not shown in the figures is used for displaying a message to urge the operator of the key controlling apparatus 50 that information for identifying a key to be added to the key control table 100 be entered. The information includes a start date and time, an end date and time and a time interval. In response to the message, the operator enters a start date and time, an end date and time and a time interval via an input unit also not shown in the figures which are then input by the key controlling apparatus 50 at steps 601, 602 and 603 respectively.

The flow of the program 21 then goes on to a step 604 to call an encryption key/decryption key generating routine for generating a pair of encryption keys (e and n) and a decryption key (d). More information on the encryption key/decryption key generating routine will be described later.

Then, the flow of the program 21 proceeds to a step 605 at which a date and time is added to a date and time column of the key control table 100. When processing of the step 605 of this flowchart shown in FIG. 3 is carried out for the first time, the date and time input at the step 601 is used as a date and time to be added to the key control table 100. In the case of processing carried out at the step 605 for the second and subsequent times, however, a date and time calculated at a step 609 as will be described later is used as a date and time to be added to the key control table 100.

Subsequently, the flow of the program 21 continues to a step 606 at which the pair of encryption keys (e and n) generated at the step 604 is added to an encryption key column of the key control table 100 on the same line as the date and time added to the key control table 100 at the step 605.

The flow of the program 21 then goes on to a step 607 at which the decryption key (d) generated at the step 604 along with the encryption key are added to a decryption key column of the key control table 100 on the same line as the date and time added to the key control table 100 at the step 605.

Then, the flow of the program 21 goes on to a step 608 to form a judgment as to whether or not the date and time added to the key control table 100 at the step 605 is coincident with or later than the end date and time received at the step 602. If the date and time added to the key control table 100 at the step 605 is earlier than the end date and time received at the step 602, the flow of the program 21 continues to a step 609 at which the time interval received at the step 603 is added to the date and time added to the key control table 100 at the step 605 to produce a new date and time to be added to the key control table 100 in the next iteration.

If the date and time added to the key control table at the step 605 is later than or coincident with the end date and time received at the step 602, on the other hand, the processing flow of the encryption key/decryption key controlling program 21 is terminated.

By executing the encryption key/decryption key controlling program 21 in accordance with the flowchart illustrated in FIG. 3, the CPU 1*a* is capable of creating the key control table 100 such as one illustrated in FIG. 2 for associating a disclosed key (that is, an encryption key) and a decryption key with a date and time at which the decryption key is to be disclosed.

The following is description of the encryption key/decryption key generating routine 700 which is executed for carrying out the processing of the step 604 of the flowchart illustrated in FIG. 3.

FIG. 4 is a flowchart used for explaining operations which are carried out when the encryption key/decryption key generating routine 700 of the encryption key/decryption key controlling program 21 loaded into the memory unit 2*a* is executed by the CPU 1*a* employed in the key controlling apparatus 50.

As illustrated in FIG. 4, the flowchart begins with a step 701 at which two large prime numbers p and q are generated. Then, the flow of the routine 700 goes on to a step 702 at which a product n of the prime numbers p and q is computed (n=p×q). Subsequently, the flow proceeds to a step 703 at which a number e that mutually appears as a prime number with respect to Euler's function of n is selected. It should be noted that Euler's function of n is defined as follows:

$$\phi(n)=(p-1)\times(q-1)$$

The flow of the routine 700 then continues to a step 704 to find d, the reciprocal of e with respect to the modulo of φ (n), Euler's function of n. At the step 704, the reciprocal d can be found from a relation equating the product with the modulo of Euler's function of n given as follows:

$$ed = 1 \times \mathrm{mod}\phi(n)$$

Then, the flow of the routine 700 goes on to a step 705 at which the values of n, e and d obtained at the steps 702, 703 and 704 respectively are set as return values to be passed to the encryption key/decryption key controlling program 21. The flow of the routine 700 then proceeds to a step 799 at which the control of execution is returned to the calling encryption key/decryption key controlling program 21.

The following is a description of the operations which are carried out in the key controlling apparatus 50 when the CPU 1*a* executes the encryption key service program 22 loaded into the memory unit 2*a*.

FIG. 5 illustrates a flowchart used for explaining the operations which are carried out in the key controlling apparatus 50 when the CPU 1*a* executes the encryption key service program 22 loaded into the memory unit 2*a*. It should be noted that the encryption key service program 22 is executed as a resident program in the key controlling apparatus 50.

As shown in FIG. 5, the program 22 begins with a step 801 to wait for a request for an encryption key to be transmitted by the information transmitting apparatus 60 to the key controlling apparatus 50 by way of the communication network 90. As the request for an encryption key arrives, the flow of the program 22 goes on to a step 802 at which information on a date and time is extracted from the request.

Then, the flow of the program 22 proceeds to a step 803 to examine whether or not the date and time indicated by the information extracted from the request has been cataloged in the key control table 100 stored on the magnetic disc 5*a*. If the date and time indicated by the information extracted from the request has not been cataloged in the key control table 100, the flow of the program 22 continues to a step 804 at which the encryption key/decryption key controlling program 21 is called. When the encryption key/decryption key controlling program 21 shown in FIG. 3 is executed, the date and time indicated by the information extracted from the request at the step 802 is used as a start date and time and an end date and time which are normally input at the steps 601 and 602 of the flowchart of the encryption key/decryption key controlling program 21 shown in FIG. 3. As for the time interval which is normally input at the step 603, a proper value is used. By execution of the encryption key/decryption key controlling program 21, the date and time as well as an encryption key and a decryption key can be added to the key control table 100. Upon the completion of the processing carried out at the step 804, the flow of the program 22 goes on to a step 805.

If the date and time indicated by the information extracted from the request at the step 802 is found cataloged in the key control table 100 at the step 803, on the other hand, the flow of the program 22 proceeds directly to the step 805, skipping the step 804.

At the step 805, an encryption key associated with the date and time indicated by the information extracted from the request for an encryption key at the step 802 is fetched from the key control table 100. Then, the flow of the program 22 goes on to a step 806 at which the encryption key fetched from the key control table 100 is transmitted to the originator of the request for the encryption key. When the above processing is completed, the flow of the program 22 returns to the step 801 to again wait for a request for an encryption key to be transmitted by the information transmitting apparatus 60 to the key controlling apparatus 50 by way of the communication network 90.

The following is description of operations which are carried out in the key controlling apparatus 50 when the CPU 1*a* executes the decryption key service program 23 loaded into the memory unit 2*a*.

FIG. 6 illustrates a flowchart used for explaining the operations which are carried out in the key controlling apparatus 50 when the CPU 1*a* executes the decryption key service program 23 loaded into the memory unit 2*a*. It should be noted that the decryption key service program 23 is executed as a resident program in the key controlling apparatus 50.

As shown in FIG. 6, the program 23 begins with a step 901 to wait for a request for an decryption key to be transmitted by the information receiving apparatus 70 to the key controlling apparatus 50 by way of the communication network 90. As the request for a decryption key arrives, the flow of the program 23 goes on to a step 902 at which information on a date and time is extracted from the request.

Then, the flow of the program 23 proceeds to a step 903 to examine whether or not the date and time indicated by the information extracted from the request has been cataloged in the key control table 100 stored on the magnetic disc 5*a*. If the date and time indicated by the information extracted from the request has not been cataloged in the key control table 100, the flow of the program 22 continues to a step 906 at which an error code is transmitted to the originator of the request for a decryption key as a response to the request. Then, the flow of the program 23 returns to the step 901 to again wait for a request for a decryption key to be transmitted by the information receiving apparatus 70 to the key controlling apparatus 50 by way of the communication network 90.

If the date and time indicated by the information extracted from the request is found cataloged in the key control table 100 at the step 903, the flow of the program 23 proceeds to a step 904. At the step 904, a decryption key associated with the date and time indicated by the information extracted from the request for a decryption key at the step 902 is fetched from the key control table 100. Then, the flow of the program 23 goes on to a step 905 at which the decryption key fetched from the key control table 100 is transmitted to the originator of the request for the decryption key. When the above processing is completed, the flow of the program 23 returns to the step 901 to again wait for a request for a decryption key to be transmitted by the information receiving apparatus 70 to the key controlling apparatus 50 by way of the communication network 90.

The following is description of operations which are carried out in the key controlling apparatus 50 when the CPU 1*a* executes the decryption key distributing program 24 loaded into the memory unit 2*a*.

FIG. 7 illustrates a flowchart used for explaining the operations which are carried out in the key controlling apparatus 50 when the CPU 1*a* executes the decryption key distributing program 24 loaded into the memory unit 2*a*. The decryption key distributing program 24 is executed as a resident program in the key controlling apparatus 50.

As illustrated in FIG. 7, the program 24 begins with a step 1001 at which the current date and time is acquired by using a function of the OS 20*a*. Then, the flow of the program 24 goes on to a step 1002 at which a decryption key associated with the current date and time acquired at the step 901 is fetched from the key control table 100. If the current date and time acquired at the step 1001 is not cataloged in the key control table 100, a decryption key associated with a date and time prior to the present date and time is fetched from the key control table 100.

The flow of the program 24 then proceeds to a step 103 at which an entry immediately following the entry fetched at the step 1002 is fetched from the key control table 100. The flow of the program 24 then continues to a step 1004 to form a judgment as to whether or not the current date and time acquired by using the function of the OS 20*a* at the step 1001 is coincident with or later than a date and time included in the entry fetched at the step 1003.

If the current date and time acquired at the step 1001 is neither coincident with nor later than the date and time included in the entry fetched at the step 1003, the flow of the program 24 goes on to a step 1005 at which the decryption key fetched at the step 1002 and information on a date and time associated with the decryption key in the key control table 100 are transmitted at the same time to the information receiving apparatus 70 by way of the communication network 90. If there are a plurality of information receiving apparatuses 70 connected to the communication network 90, the decryption key and information on a date and time associated with the decryption key are transmitted to all the information receiving apparatuses 70 by simultaneous broadcasting communication which can be implemented by use of a broadcast packet or a multi-cast packet used in a communication system using a communication network. In the case of a broadcast packet, addresses of a plurality of transmission destinations are included in the header of the packet. In the case of a multi-cast packet, the header of the packet includes an address illustrating a plurality of transmission destinations.

When the processing carried out at the step 1005 has been completed, the flow of the program 24 goes on to a step 1006 at which a new current date and time is acquired by using a function of the OS 20*a*. This is because the current date and time acquired at the step 1001 may have become obsolete. The flow of the program 24 then returns to the step 1004.

If the outcome of the judgment formed at the step 1004 indicates that the current date and time acquired at the step 1001 is coincident with or later than the date and time included in the entry fetched at the step 1003, the flow of the program 24 returns to the step 1002 at which a decryption key associated this time with the date and time included in the entry fetched at the step 1003 is fetched from the key control table 100.

By iterating the loop comprising the steps 1004 to 1006 of the flowchart illustrated in FIG. 7, decryption keys cataloged in the key control table 100 are sequentially transmitted to information receiving apparatuses 70 through simultaneous broadcasting communication at the step 1005 at a rate of one key per iteration until, at the step 1004, the date and time fetched from the key control table 100 is found earlier than the current date and time acquired most recently acquired at the step 1006 in which case the flow of the program 24 departs from the loop, going on to the step 1002. An example of a chronological list of disclosure of decryption keys transmitted from the key controlling apparatus 50 by the loop is illustrated in FIG. 8.

Next, the information transmitting apparatus 60 is described in detail.

The description of the information transmitting apparatus 60 begins with an explanation of the configuration of encrypted information generated by the information transmitting apparatus 60.

Figures 8, 9:
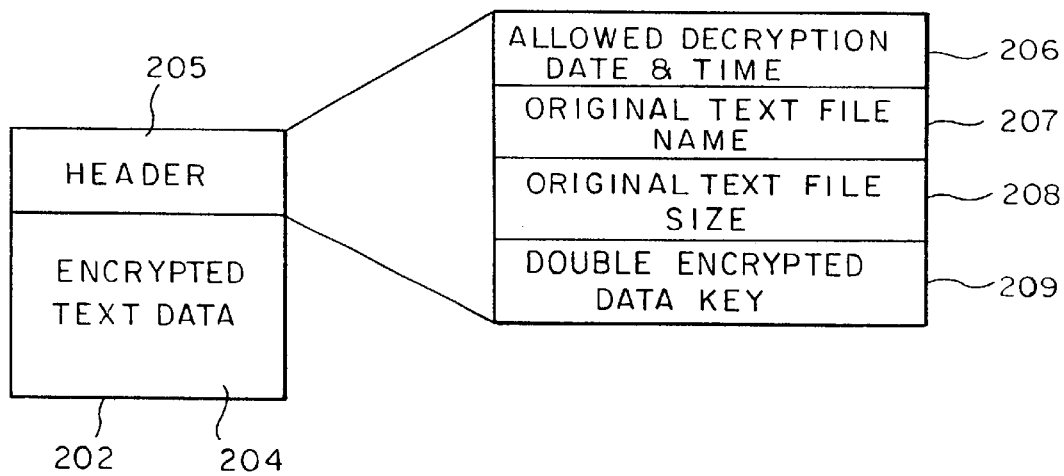
FIG. 8 is a diagram illustrating an example of a chronological list of disclosure of decryption keys transmitted from the key controlling apparatus.
FIG. 9 is a diagram used for explaining a typical configuration of encrypted information generated by an information transmitting apparatus 60.

FIG. 9 is a diagram used for explaining a typical configuration of encrypted information generated by the information transmitting apparatus 60. It should be noted that, while information to be encrypted can be any information as long as the information is data handled in electronic equipment such as contents of a database or an electronic mail, in the following description, information encrypted in file units is taken as an example.

In FIG. 9, reference numeral 202 denotes an encrypted text file for storing data after encryption. The encrypted data stored in the encrypted text file 202 comprises encrypted text data 204, that is, data resulting from encryption of an original text file, and a header 205 added to the encrypted text data 204.

The header 205 comprises an allowed decryption date 206, a file name 207, a file size 208 and a double encrypted data key 209. The allowed decryption date 206 is information indicating a date at which the encrypted text data 204 can be decrypted, that is, a date at which the secrecy protection of the encrypted text data is ended. The file name 207 is the name of an original text file serving as the source of the encrypted text data 204. The file size 208 is the size of the original text file. The double encrypted data key 209 is data resulting from encryption of a data key and is used in the encryption of this original text file. In the encryption of the data key, an encryption key acquired from the key controlling apparatus 50 and an individual encryption key to be described later are used.

It is obvious from the typical configuration of encrypted information shown in FIG. 9 that, in the present embodiment, an original text file is not encrypted directly by using an encryption key acquired from the key controlling apparatus 50, but an original text file is encrypted by a key used in a symmetrical key based encryption system. To be more specific, in a symmetrical key based encryption system, an original text file is encrypted by a data key which is used as a key common to both encryption and decryption. The encryption key obtained from the key controlling apparatus 50 itself is used for encrypting the data key which is used in the encryption of the original text file.

Figure 10:
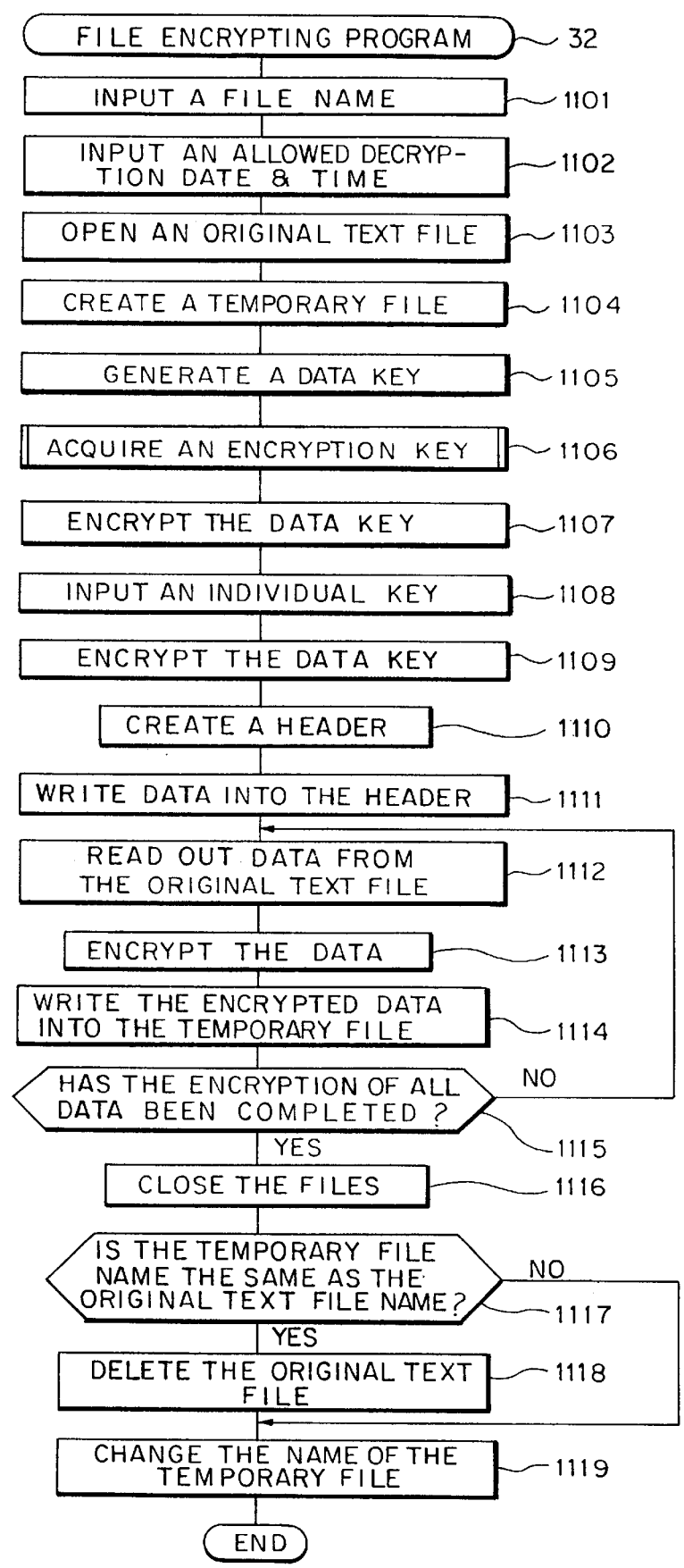
FIG. 10 illustrates a flowchart used for explaining operations which are carried out in the information transmitting apparatus when an information encrypting program is executed.

The following is a description of operations which are carried out in the information transmitting apparatus 60 when the CPU 1*b* executes the file encrypting program 32 loaded into the memory unit 2*b*. FIG. 10 illustrates a flowchart used for explaining the operations which are carried out in the information transmitting apparatus 60 when the CPU 1*b* executes the information encrypting program 32 loaded into the memory unit 2*b*.

First, equipment such as a display unit not shown in the figures is used for displaying a message to urge the user of the information transmitting apparatus 60 that the user enter the name of a file containing an original text to be encrypted and a date and time at which an encrypted text file resulting from the encryption of the original text file can be decrypted. A file name and a date and time entered by the user via an input unit also not shown in the figure in response to the message are input at steps 1101 and 1102 of the flowchart shown in FIG. 10 respectively.

The flow of the program 32 then goes on to a step 1103 at which a file identified by the file name input at the step 1101 is opened. Then, the flow of the program 32 proceeds to a step 1104 at which a temporary file with a tentative file name is created.

Subsequently, the flow of the program 32 continues to a step 1105 at which a random number is generated to serve as a data key. The flow of the program 32 then goes on to a step 1106 at which the encryption key acquiring program 31 is executed. The encryption key acquiring program 31 acquires an encryption key, which forms a pair in conjunction with a decryption key to be disclosed at the date and time input at the step 1102, from the key controlling apparatus 50.

Then, the flow of the program 32 proceeds to a step 1107 at which the data key generated at the step 1105 is encrypted by using the encryption key acquired from the key controlling apparatus 50 at the step 1106 to produce an encrypted data key. Subsequently, equipment such as a display unit not shown in the figures is used for displaying a message to urge the user of the information transmitting apparatus 60 that an individual encryption key be entered. The individual encryption key will be used for double encrypting the encrypted data key produced at the step 1107. As an individual encryption key is entered by the user via an input unit also not shown in the figure in response to the message, the flow of the program 32 continues to a step 1108 at which the individual encryption key is input.

The flow of the program then continues to a step 1109 at which the encrypted data key produced at the step 1107 is re-encrypted by using the individual encryption key input at the step 1108 to generate a double encrypted data key.

Then, the flow of the program 32 goes on to a step 1110 at which a header is added to the head portion of the temporary file created at the step 1104. Subsequently, the flow of the program proceeds to a step 1111 at which information specifying the allowed file decryption date and time input at the step 1102, the file name input at the step 1101, the size of a file identified by this file name and the double encrypted data key generated at the step 1109 is written into the header added to the head portion of the temporary file in the order they are enumerated.

The flow of the program 32 then continues to a step 1112 at which data is read out from the original text file opened at the step 1103. Then, the flow of the program 32 goes on to a step 1113 at which encrypted data is generated by encryption of the data read out at the step 1112 using the double encrypted data key generated at the step 1109. Subsequently, the flow of the program 32 proceeds to a step 1114 at which the encrypted data is written into the temporary file created at the step 1104.

The flow of the program 32 then continues to a step 1115 to form a judgment as to whether or not the encryption of all the data of the original text file opened at the step 1103 has been completed. If the encryption has not been completed yet, the flow of the program 32 returns to the step 1112 to repeat the pieces of processing of the steps 1112 to 1115 until the encryption is completed. As the encryption of all the data of the original text file is found completed, the flow of the program 32 goes on to a step 1116 at which the original text file and the temporary file are both closed.

Then, the flow of the program 32 proceeds to a step 1117 to form a judgment as to whether or not the name of the original text file input at the step 1101 is the same as the tentative name of the temporary file created at the step 1104. If the name of the original text file is the same as the tentative name of the temporary file, the flow of the program 32 continues to a step 1118 at which the original text file is deleted. The flow of the program 32 then goes on to a step 1119 at which the tentative name of the temporary file created at the step 1104 is changed to the name of the original text file input at the step 1101. Finally, the processing of the program 32 is finished.

If the name of the original text file is not the same as the tentative name of the temporary file, on the other hand, the flow of the program 32 continues directly to the step 1119 at which the tentative name of the temporary file created at the step 1104 is changed to the name of the original text file input at the step 1101. Finally, the processing of the program 32 is finished.

The information transmitting apparatus 60 is capable of transmitting an encrypted text file created as described above to a desired information receiving apparatus 70 by way of the communication network 90. The following is description of operations which are carried out in the information transmitting apparatus 60 when the CPU 1b executes the encryption key acquiring program 31 loaded into the memory unit 2b.

Figure 11:
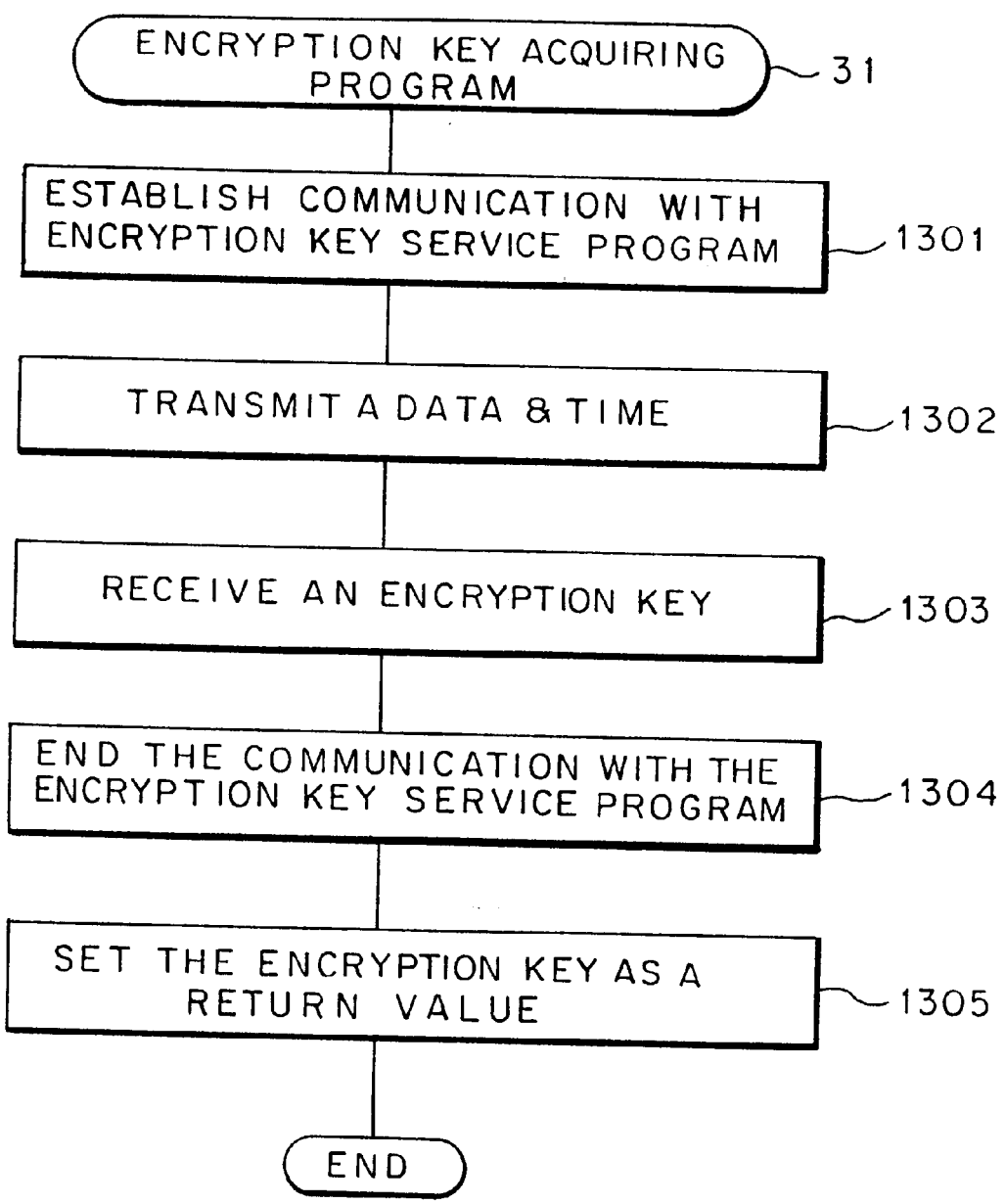
FIG. 11 illustrates a flowchart used for explaining operations which are carried out in the information transmitting apparatus when an encryption key acquiring program is executed.

FIG. 11 illustrates a flowchart used for explaining the operations which are carried out in the information transmitting apparatus 60 when the CPU 1b executes the encryption key acquiring program 31 loaded into the memory unit 2b. It should be noted that the encryption key acquiring program 31 is executed at the step 1106 of the flowchart of FIG. 10 representing the file encrypting program 32.

As illustrated in FIG. 11, the flowchart begins with a step 1301 at which communication between the information transmitting apparatus 60 and the key controlling apparatus 50 through the communication network 90 is established.

The flow of the program 31 then goes on to a step 1302 at which information identifying the allowed decryption date and time input at the step 1102 of the file encrypting program 32 shown in FIG. 10 is transmitted to the key controlling apparatus 50 by way of the communication network 90. Receiving the information on the allowed decryption date and time from the information transmitting apparatus 60, the key controlling apparatus 50 executes the encryption key service program 22 to search the key control table 100 for an encryption key associated with the allowed decryption date and time. The key controlling apparatus 50 then transmits the encryption key to the information transmitting apparatus 60 that transmitted the information identifying the allowed decryption date and time input.

At a step 1303 of the flowchart illustrated in FIG. 11, the encryption key from the key controlling apparatus 50 associated with the allowed decryption date and time transmitted to the key controlling apparatus 50 at the step 1302 is received by the information transmitting apparatus 60. The flow of the program 31 then goes on to a step 1304 at which the communication with the key controlling apparatus 50 is discontinued. Then, the flow of the program 31 proceeds to a step 1305 at which the encryption key received at the step 1303 is set as a return value to be passed to the file encrypting program 32 before ending this routine.

Next, the information receiving apparatus 70 is described in detail. The description begins with explanation of operations which are carried out in the information receiving apparatus 70 when the CPU 1c executes the file decrypting program 42 loaded into the memory unit 2c.

Figure 12:
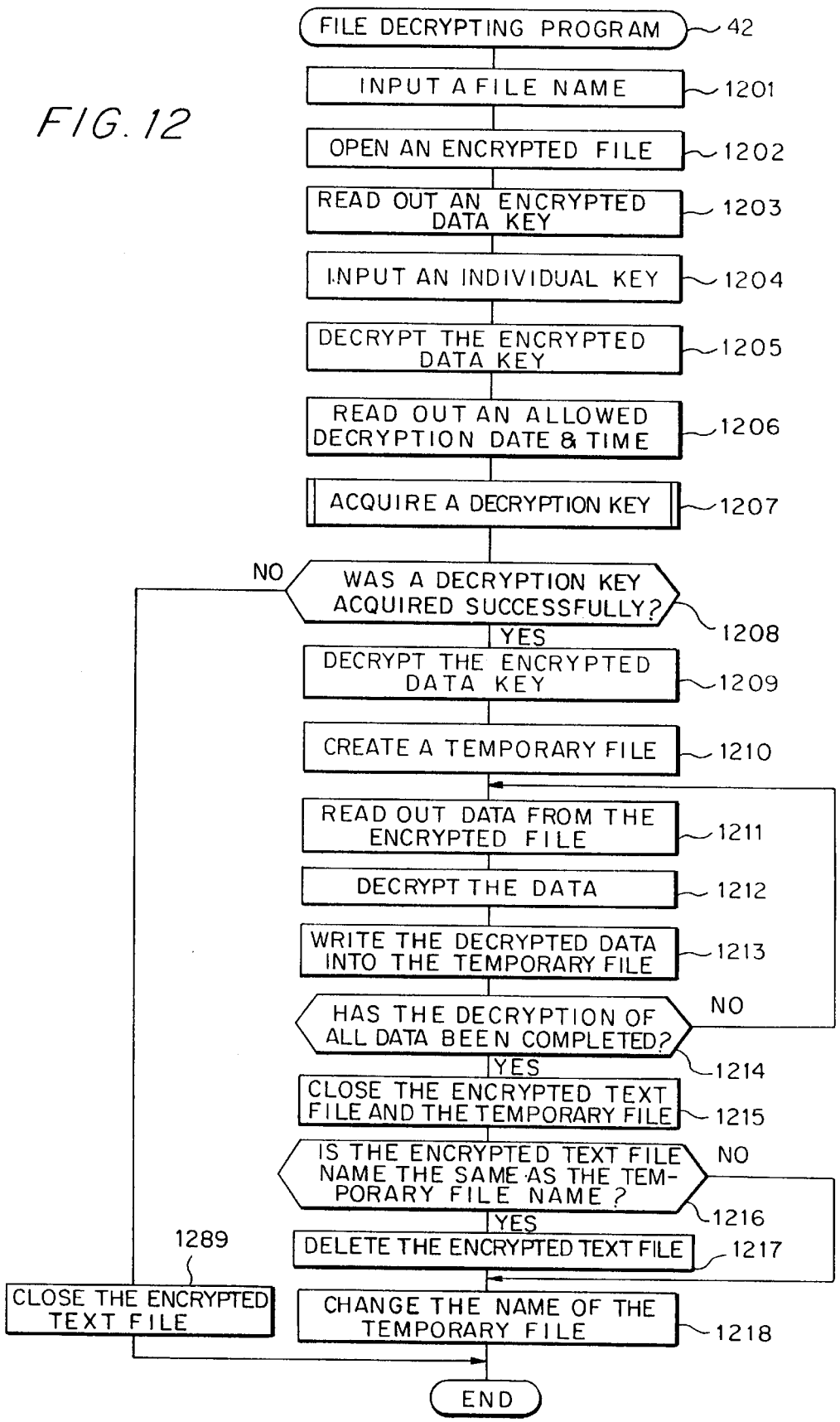
FIG. 12 illustrates a flowchart used for explaining operations which are carried out in an information receiving apparatus when a file decrypting program is executed.

FIG. 12 illustrates a flowchart used for explaining the operations which are carried out in the information receiving apparatus 70 when the CPU 1c executes the file decrypting program loaded into the memory unit 2c. First of all, equipment such as a display unit not shown in the figures is used for displaying a message to urge the user of the information receiving apparatus 70 that the user enter the name of an encrypted text file to be decrypted among encrypted text files received from the information transmitting apparatus 60. The name of an encrypted text file entered by the user via an input unit also not illustrated in FIG. 12 in response to the message is input at a step 1201.

The flow of the program 42 then goes on to a step 1202 at which an encrypted text file identified by the name input at the step 1201 is opened. Then, the flow of the program 42 proceeds to a step 1203 at which a double encrypted data key is fetched from the header of the encrypted text file opened at the step 1202. Subsequently, equipment such as the display unit not illustrated in the figures is used for displaying a message to urge the user of the information receiving apparatus 70 that the user enter an individual encryption key to be used for decrypting the double encrypted data key fetched at the step 1203. An individual encryption key entered by the user via the input unit also not illustrated in the figure in response to the message is input at a step 1204.

The user of the information receiving apparatus 70 is assumed to have been informed of the individual encryption key by the sender of the encrypted text file in advance.

The flow of the program 42 then continues to a step 1205 at which the double encrypted data key fetched at the step 1203 is decrypted by the individual encryption key input at the step 1204, being converted into a single encrypted data key. Then, the flow of the program 42 goes on to a step 1206 at which information on an allowed decryption date and time is fetched from the header of the encrypted text file opened at the step 1202. Subsequently, the flow of the program 42 proceeds to a step 1207 at which the decryption key acquiring program 41 is called, and the allowed decryption date and time indicated by the information fetched at the step 1207 is passed to the decryption key acquiring program 41 as a parameter. The decryption key acquiring program 41 acquires a decryption key associated with the allowed decryption date and time from the key controlling apparatus 50.

The flow of the program 42 then continues to a step 1208 to form a judgment as to whether or not the decryption key acquiring program 41 has acquired a decryption key associated with the allowed decryption date and key successfully at the step 1207 by referring to a value returned by the decryption key acquiring program 41. If the decryption key acquiring program 41 did not acquire a decryption key associated with the allowed decryption date and key successfully, the flow of the program 42 goes on to a step 1289 at which the encrypted text file opened as the step 1202 is closed before the processing of the program 42 is ended.

If the decryption key acquiring program 41 has acquired a decryption key associated with the allowed decryption date and key successfully, on the other hand, the flow of the program 42 goes on to a step 1209.

At the step 1209, the single encrypted data key produced at the step 1205 is further decrypted by using the decryption key acquired at the step 1207 to produce a data key used in the encryption of the encrypted text file.

Then, the flow of the program goes on to a step 1210 at which a temporary file with a tentative name is created. Subsequently, the flow of the program 42 continues to a step 1211 at which data is read out from the encrypted text file opened at the step 1202. Then, the flow of the program 42 goes on to a step 1212 at which original text data is generated by decryption of the data read out at the step 1211 using the encrypted data key generated at the step 1209. Subsequently, the flow of the program 42 proceeds to a step 1213 at which the original text data produced at the step 1212 is written into the temporary file created at the step 1210.

The flow of the program 42 then continues to a step 1214 to form a judgment as to whether or not the decryption of all the data of the encrypted text file opened at the step 1202 has been completed. If the decryption has not been completed yet, the flow of the program 42 returns to the step 1211 to repeat the pieces of processing of the steps 1211 to 1213 until the decryption of all the data is completed. As the decryption of all the data of the original text file is found completed, the flow of the program 42 goes on to a step 1215 at which the encrypted text file and the temporary file are both closed.

Then, the flow of the program 42 proceeds to a step 1216 to form a judgment as to whether or not the name of the encrypted text file input at the step 1201 is the same as the tentative name of the temporary file created at the step 1210. If the name of the encrypted text file is the same as the tentative name of the temporary file, the flow of the program 42 continues to a step 1217 at which the encrypted text file is deleted. The flow of the program 42 then goes on to a step 1218 at which the tentative name of the temporary file created at the step 1210 is changed to the name of the encrypted text file input at the step 1201. Finally, the processing of the program 42 is finished.

If the name of the encrypted text file is not the same as the tentative name of the temporary file, on the other hand, the flow of the program 42 continues directly to the step 1218 at which the tentative name of the temporary file created at the step 1210 is changed to the name of the encrypted text file input at the step 1201. Finally, the processing of the program 42 is finished.

The following is a description of operations which are carried out in the information receiving apparatus 70 when the CPU 1c executes the decryption key acquiring program 41 loaded into the memory unit 2c.

Figure 13:
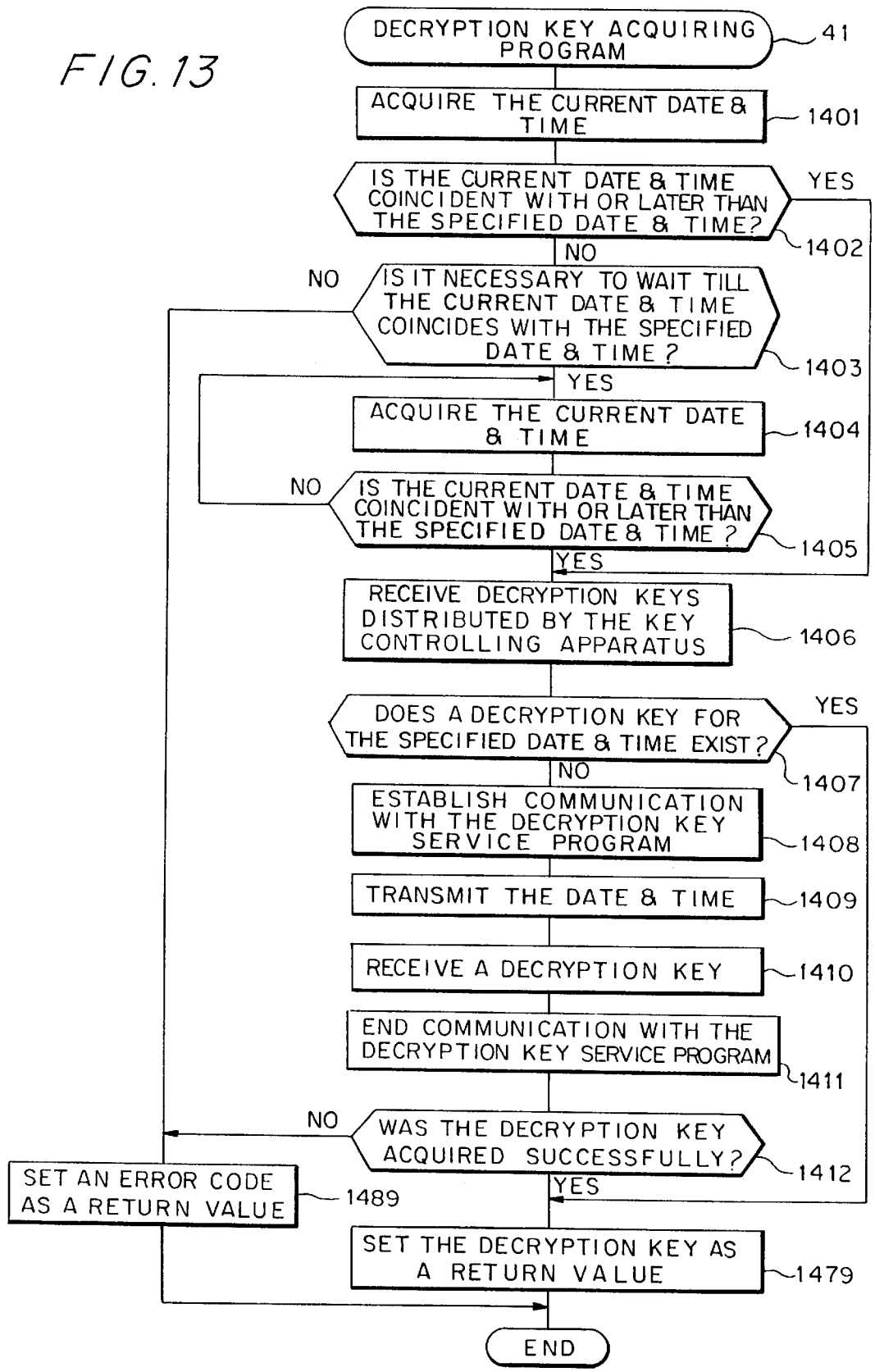
FIG. 13 illustrates a flowchart used for explaining operations which are carried out in the information receiving apparatus when a decryption key acquiring program is executed.

FIG. 13 illustrates a flowchart used for explaining the operations which are carried out in the information receiving apparatus 70 when the CPU 1c executes the decryption key acquiring program 41 loaded into the memory unit 2c. It should be noted that the decryption key acquiring program 41 is executed at the step 1207 of the flowchart of FIG. 12 representing the file decrypting program 42.

As illustrated in FIG. 13, the program 41 begins with a step 1401 at which the present date and time is acquired by using a function of the OS 20c. Then, the flow of the program 41 goes on to a step 1402 at which the present date and time acquired at the step 1401 is compared with the allowed decryption date and time received as a parameter from the calling file decrypting program 42. If the result of the comparison indicates that the present date and time is coincident with or later than the allowed decryption date and time, the flow of the program 41 goes on to a step 1406. If the present date and time precedes the allowed decryption date and time, on the other hand, the flow of the program 41 goes on to a step 1403.

At the step 1403, equipment such as the display unit not shown in the figures is used for illustrating the user of the information receiving unit 70 an inquiry as to whether or not the user is willing to wait until the present date and time becomes coincident with the allowed decryption date and time. Then, the program 41 waits for the user to enter an instruction via an input unit also not illustrates in the figure in response to the inquiry.

If the instruction entered by the user indicates that the user is not willing to wait until the present date and time becomes coincident with the allowed decryption date and time, the flow of the program 41 goes on to a step 1489 at which an error code is set as a return value before finishing the processing of the program 41.

If the instruction entered by the user indicates that the user is willing to wait until the present date and time becomes coincident with the allowed decryption date and time, on the other hand, the flow of the program 41 goes on to a step 1404 at which the present date and time is acquired by using the function of the OS 20c. Then, the flow of the program 41 goes on to a step 1405 at which the present date and time acquired at the step 1404 is compared with the allowed decryption date and time received as a parameter from the calling file decrypting program 42. If the result of the comparison indicates that the present date and time is coincident with or later than the allowed decryption date and time, the flow of the program 41 goes on to the step 1406. If the present date and time still precedes the allowed decryption date and time, on the other hand, the flow of the program 41 returns to the step 1404 to repeat the pieces of processing of the steps 1404 and 1405 until the present date and time becomes coincident with or later than the allowed decryption date and time.

At the step 1406, decryption keys disclosed and distributed by the key controlling apparatus 50 through the communication network 90 are received. The flow of the program 41 then goes on to a step 1407 to form a judgment as to whether or not the decryption keys received at the step 1406 include one associated with the allowed decryption data and time passed to the program 41 by the calling file decrypting program 42 as a parameter. The judgment is based on information on a date and time appended to each of the decryption keys.

If the decryption keys received at the step 1406 include one associated with the allowed decryption data and time passed to the program 41 by the calling file decrypting program 42 as a parameter, the flow of the program 41 goes on to a step 1479 at which the decryption key associated with the allowed decryption data and time is set as a return value before ending the processing of the program 41. If the decryption keys received at the step 1406 do not include one associated with the allowed decryption data and time, on the other hand, the flow of the program 41 goes on to a step 1408.

At the step 1408, communication between the information receiving apparatus 70 and the key controlling apparatus 50 through the communication network 90 is established.

The flow of the program 41 then goes on to a step 1409 at which information identifying the allowed decryption data and time passed to the program 41 by the calling file decrypting program 42 as a parameter is transmitted to the key controlling apparatus 50. Receiving the information on the allowed decryption date and time from the information receiving apparatus 70, the key controlling apparatus 50 executes the decryption key service program 23 to search the key control table 100 for a decryption key associated with the allowed decryption date and time. The key controlling apparatus 50 then transmits the decryption key to the information receiving apparatus 70 that transmitted the information identifying the allowed decryption date and time.

At a step 1410 of the flowchart illustrates in FIG. 13, the decryption key from the key controlling apparatus 50 associated with the allowed decryption date and time transmitted to the key controlling apparatus 50 is received by the information receiving apparatus 70. The flow of the program 41 then goes on to a step 1411 at which the communication with the key controlling apparatus 50 is discontinued. Then, the flow of the program 41 proceeds to a step 1412 at which a result of receiving the decryption key is examined to form a judgment as to whether or not the decryption key has been received without an error.

If the outcome of the judgment indicates that the decryption key has been received without an error, the flow of the program 41 goes on to the step 1479 at which the decryption key associated with the allowed decryption data and time is set as a return value before ending the processing of the program 41. If the outcome of the judgment suggests that there is an error indicating that the operation to acquire the decryption key has ended in a failure, the flow of the program 41 goes on to the step 1489 at which an error code is set as a return value before finishing the processing of the program 41.

In the key controlling system implemented by the embodiment described above, the user of the information transmitting apparatus 60 is capable of encrypting information produced thereby and distributing the encrypted information to information users prior to a date and time at which the secrecy protection of the data is ended. As a result, it is no longer necessary for the information producer to control the date and time at which the produced information is disclosed.

In addition, it is not until a date or a date and time at which secrecy protection of encrypted information received by the user of the information receiving apparatus 70 is ended that the user of the information receiving apparatus 70 is allowed to acquire a decryption key for decrypting the encrypted information. As a result, the encrypted information can be kept secret until the date or the date and time at which the secrecy protection of the encrypted information is ended.

Furthermore, since the user of the information receiving apparatus 70 is allowed to acquire a decryption key for decrypting encrypted information after a date and time at which secrecy protection of the encrypted information received by the user of the information receiving apparatus 70 is ended, the user of the information receiving apparatus 70 is capable of decrypting the encrypted information received in advance by using the decryption key. As a result, if there are a plurality of information receiving apparatuses 70, disclosure of encrypted information at the same time can be assured.

As described above, in the present embodiment, decryption keys are disclosed by simultaneous broadcasting communication using a single channel as illustrates in FIG. 8. It should be noted, however, that the description is not intended to be construed in a limiting sense. That is, the scope of the present invention is not limited to such a configuration. For example, decryption keys can be disclosed by using a plurality of channels as illustrates in FIG. 14. In this case, the period of the disclosure (that is, the simultaneous broadcasting communication) of a decryption key can be lengthened. As a result, the information receiving apparatus 70 is capable of acquiring a decryption key for an allowed decryption date and time without the need to make an access to the key controlling apparatus 50 even after some time has lapsed since the coincidence of the present date and time with the allowed decryption date and time.

Figure 15:
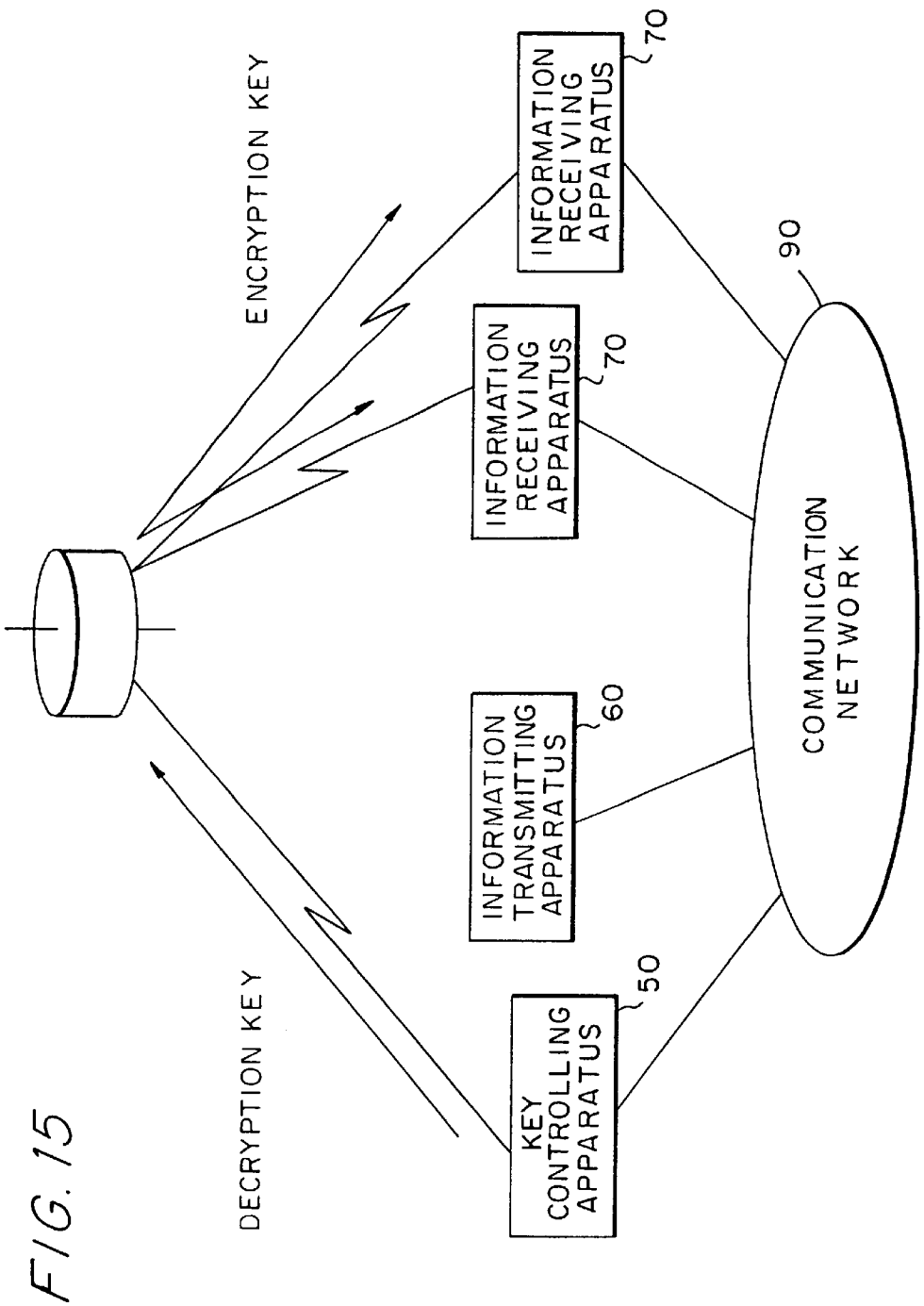
FIG. 15 is a diagram used for explaining a modified version of the present invention wherein a decryption key is disclosed to information receiving apparatuses using a radio broadcasting method such as the satellite system.

In addition, in the present embodiment described above, the key controlling apparatus 50 transmits a decryption key to information receiving apparatuses 70 at the same time by way of the communication network 90 as a broadcast packet or a multi-cast packet. As an alternative, the decryption key may be disclosed to information receiving apparatuses 70 by adopting a radio broadcasting method such as the satellite system illustrates in FIG. 15. By adopting a radio broadcasting method such as the satellite system, a decryption key can be distributed to all of a plurality of information receiving apparatuses 70 at the same time.

Furthermore, in the present embodiment described above, a data key is encrypted by using an individual encryption key. It should be noted, however, that the description is not intended to be construed in a limiting sense. That is, the scope of the present invention is not limited to such a scheme. An encryption key and a decryption key acquired from the key controlling apparatus 50 can be used directly for encrypting and decrypting data respectively. In this case, however, it is necessary to take the utmost care of the fact that pieces of encrypted data having the same allowed decryption date and time can be decrypted by using a decryption key for the allowed decryption date and time.

In addition, in the present embodiment described above, information encrypted at the information transmitting apparatus 60 is transmitted to the information receiving apparatus 70 by way of the communication network 90. It is worth noting, however, that the description is not intended to be construed in a limiting sense. That is, the scope of the present invention is not limited to such a configuration. For example, encrypted information can be distributed by means of recording media such as a floppy disc and a CD-ROM used for recording the information without the use of the communication network 90. Furthermore, in the present embodiment described above, one unit of key controlling apparatus 50 is used for controlling encryption and decryption keys and for rendering services related to encryption and decryption keys. For example, a plurality of information processing apparatuses can also be used for controlling encryption and decryption keys and for rendering services related to the encryption and decryption keys.

In addition, in the present embodiment described above, a variety of programs executed by the apparatuses composing the key controlling system are stored in magnetic discs. It is worth noting, however, that the description is not intended to be construed in a limiting sense. That is, the scope of the present invention is not limited to such a scheme. For example, the programs can also be stored in optical discs such as CD-ROMs or other recording media.

As described above, the present invention provides a good key controlling system for implementing simultaneous disclosure of information to a plurality of users.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

What is claimed is:

1. A key managing system comprising:
    an information decrypting apparatus for decrypting information by using a decryption key;
    a key controlling apparatus for controlling publicity of said decryption key for decrypting information in said information decrypting apparatus; and
    a communication network coupled to said information decrypting apparatus and said key controlling apparatus,
    wherein said key controlling apparatus comprises:
        a key storage for storing decryption keys,
        a key control table storage for storing a key control table indicating disclosure times of said decryption keys respectively,
        a key searching apparatus for searching said key control table stored in said key control table storage for a decryption key that can be disclosed according to a current time, and
        decryption key disclosing means for disclosing said decryption key that can be disclosed via said network to enable said information decrypting apparatus to acquire said decryption key
    wherein said information decrypting apparatus comprises:
        encrypted information acquiring means for acquiring encrypted information formed by an information encrypting apparatus,
        decryption key acquiring means for acquiring, subsequent to acquiring said encrypted information, said disclosed decryption key via said network referring to a disclosure time included in said encrypted information that has been acquired by said encrypted information acquiring means, and
        information decrypting means for decrypting encrypted data included in said encrypted information that has been acquired by using said acquired decryption key.

2. A key managing system according to claim 1, wherein a plurality of said information decrypting apparatuses are included in said key managing system;
    wherein said information decrypting apparatuses are all connected to said key controlling apparatus by said communication network; and
    wherein said decryption key disclosing means, included in said key controlling apparatus, distributes any of said decryption keys to said information decrypting apparatuses by simultaneously broadcasting through said communication network a broadcast packet or a multicast packet to said information decrypting apparatuses.

3. A key managing system according to claim 1, wherein a plurality of said information decrypting apparatuses are included in said key managing system; and
    wherein said decryption key disclosing means, included in said key controlling apparatus, discloses any of said decryption keys to said information decrypting apparatuses by radio broadcasting.

4. A key managing system according to claim 1, wherein said key controlling apparatus further comprises:
    key generating means which is used for generating a new pair of encryption and decryption keys when a decryption key corresponding to a disclosure time specified by said information encrypting apparatus is not found in said key control table stored in said key control table storage; and
    a control table creating means for adding said new pair of encryption and decryption keys generated by said key generating means and said disclosure time specified by said information encrypting apparatus, for which said new pair of encryption and decryption keys is generated by said key generating means, to said key control table.

5. A key managing system according to claim 2, wherein said key controlling apparatus further comprises:
    key generating means which is used for generating a new pair of encryption and decryption keys when a decryption key corresponding to a disclosure time specified by said information encrypting apparatus is not found in said key control table stored in said key control table storage; and
    a control table creating means for adding said new pair of encryption and decryption keys generated by said key generating means and said disclosure time specified by said information encrypting apparatus, for which said new pair of encryption and decryption keys is generated by said key generating means, to said key control table.

6. A key managing system according to claim 3, wherein said key controlling apparatus further comprises:
    a key generating means which is used for generating a new pair of encryption and decryption keys when a decryption key corresponding to a disclosure time specified by said information encrypting apparatus is not found in said key control table stored in said key control table storage; and a control table creating means for adding said new pair of encryption and decryption keys generated by said key generating means and said disclosure time specified by said information encrypting apparatus, for which said new pair of encryption and decryption keys is generated by said key generating means, to said key control table.

7. A key managing system according to claim 1, wherein said data encrypting means encrypts data to be transmitted by using a data key to produce encrypted data and, at the same time, double-encrypts said data key by using an individual encryption key entered by an operator and one of said encryption keys acquired by said encryption key acquiring means to produce a double encrypted data key;

wherein said encrypted information forming means forms encrypted information to be transmitted to said information decrypting apparatus by adding information on a time, at which said encrypted data produced by said data encrypting means is to be decrypted, and said double encrypted data key produced by said data encrypting means to said encrypted data; and wherein said information decrypting means decrypts said double encrypted data key included in said encrypted information acquired by said encrypted information acquiring means by using an individual encryption key entered by an operator and one of said decryption keys acquired by said decryption key acquiring means to produce a data key and, at the same time, decrypts said encrypted data included in said encrypted information by using said data key.

8. A key managing system according to claim 2, wherein said data encrypting means encrypts data to be transmitted by using a data key to produce encrypted data and, at the same time, double-encrypts said data key by using an individual encryption key entered by an operator and one of said encryption keys acquired by said encryption key acquiring means to produce a double encrypted data key;

wherein said encrypted information forming means forms encrypted information to be transmitted to said information decrypting apparatus by adding information on a time, at which said encrypted data produced by said data encrypting means is to be decrypted, and said double encrypted data key produced by said data encrypting means to said encrypted data; and wherein said information decrypting means decrypts said double encrypted data key included in said encrypted information acquired by said encrypted information acquiring means by using an individual encryption key entered by an operator and one of said decryption keys acquired by said decryption key acquiring means to produce a data key and, at the same time, decrypts said encrypted data included in said encrypted information by using said data key.

9. A key managing system according to claim 3, wherein said data encrypting means encrypts data to be transmitted by using a data key to produce encrypted data and, at the same time, double-encrypts said data key by using an individual encryption key entered by an operator and one of said encryption keys acquired by said encryption key acquiring means to produce a double encrypted data key;

wherein said encrypted information forming means forms encrypted information to be transmitted to said information decrypting apparatus by adding information on a time, at which said encrypted data produced by said data encrypting means is to be decrypted, and said double encrypted data key produced by said data encrypting means to said encrypted data; and wherein said information decrypting means decrypts said double encrypted data key included in said encrypted information acquired by said encrypted information acquiring means by using an individual encryption key entered by an operator and one of said decryption keys acquired by said decryption key acquiring means to produce a data key and, at the same time, decrypts said encrypted data included in said encrypted information by using said data key.

10. A key managing system according to claim 4, wherein said data encrypting means encrypts data to be transmitted by using a data key to produce encrypted data and, at the same time, double-encrypts said data key by using an individual encryption key entered by an operator and one of said encryption keys acquired by said encryption key acquiring means to produce a double encrypted data key;

wherein said encrypted information forming means forms encrypted information to be transmitted to said information decrypting apparatus by adding information on a time, at which said encrypted data produced by said data encrypting means is to be decrypted, and said double encrypted data key produced by said data encrypting means to said encrypted data; and wherein said information decrypting means decrypts said double encrypted data key included in said encrypted information acquired by said encrypted information acquiring means by using an individual encryption key entered by an operator and one of said decryption keys acquired by said decryption key acquiring means to produce a data key and, at the same time, decrypts said encrypted data included in said encrypted information by using said data key.

11. A key managing system according to claim 1, wherein said information encrypting apparatus and said information decrypting apparatus are connected to each other by said communication network; and wherein said information encrypting apparatus further comprises:
an encrypted information transmitting means for transmitting encrypted information formed by said encrypted information forming means to said information decrypting means by said communication network.

12. A key controlling apparatus for controlling publicity of encryption and decryption keys used for encrypting and decrypting information respectively, said key controlling apparatus comprising:

a key storage for storing at least a pair of said encryption and decryption keys for encrypting and decrypting information respectively;

a key control table storage for storing a key control table indicating a relation between said decryption keys stored in said key storage and disclosure times of said decryption keys;

a key searching means for searching said key control table stored in said key control table storage for a decryption key that can be disclosed at a current time specified by an information encrypting apparatus for encrypting information and an encryption key forming a pair corresponding to said decryption key;

an encryption key transmitting means for transmitting an encryption key resulting from the search performed by said key searching means to said information encrypting apparatus; and a decryption key disclosing means for disclosing a decryption key, that can be disclosed at the current time according to said relation shown by said key control table stored in said key control table storage, to at least one of a plurality of information decrypting apparatuses each for decrypting information to permit said at least one information decrypting apparatus to decrypt encrypted data included in encrypted information having been previously acquired by said information decrypting apparatus, wherein said encrypted data is decrypted using said decryption key acquired at a disclosure time included in said encrypted information.

13. An information encrypting apparatus for encrypting information, comprising:

encryption key acquiring means for acquiring an encryption key from a key controlling apparatus for controlling publicity of encryption and decryption keys by transmitting a time, at which secrecy protection of data to be encrypted will be ended, to said key controlling apparatus wherein said encryption key forms a pair corresponding to one of said decryption keys to be disclosed at a disclosure time in said key controlling apparatus;

data encrypting means for encrypting data by using said encryption key acquired by said encryption key acquiring means; and encrypted information forming means for forming encrypted information to be transmitted to an information decrypting apparatus for decrypting information by adding data representing the time, at which secrecy protection of said encrypted data is to be ended, to said data encrypted by said data encrypting means.

14. An information decrypting apparatus for decrypting encrypted data produced by an information encrypting apparatus, comprising:

time extracting means for extracting data representing a time, at which secrecy protection of said encrypted data produced by said information encrypting apparatus is to be ended, from encrypted information formed by said information encrypting apparatus;

decryption key acquiring means which is used for acquiring a decryption key disclosed by a key controlling apparatus as a current time becomes coincident with a disclosure time indicated by said data representing a disclosure time extracted by said time extracting means; and information decrypting means for decrypting said encrypted data produced by said information encrypting apparatus using said decryption key acquired by said decryption key acquiring means.

15. A recording medium for storing a program for managing encryption and decryption keys used for encrypting and decrypting information respectively, said program when executed in an information processing apparatus causes said information processing apparatus to perform the steps of:

storing at least a pair of encryption and decryption keys corresponding to a time at which said decryption key in said pair is disclosed in a key control table storage unit as a key control table;

searching said key control table stored in said key control table storage unit for a decryption key corresponding to a disclosure time specified by an information encrypting apparatus for encrypting information and an encryption key forming a pair corresponding to said decryption key;

transmitting an encryption key resulting from the search performed by the searching step to said information encrypting apparatus; and disclosing a decryption key corresponding to a current time according to said key control table stored in said key control table storage unit to at least one of a plurality of information decrypting apparatuses each for decrypting information;

wherein encrypted data included in said encrypted information is decrypted using said decryption key acquired at said disclosure time included in said encrypted information.

16. A recording medium for storing a program for encrypting information, wherein said program when executed in an information processing apparatus causes said information processing apparatus to perform the steps of:

acquiring an encryption key from a key controlling apparatus for controlling encryption and decryption keys by transmitting a time at which secrecy protection of data to be encrypted will be ended, to said key controlling apparatus wherein said encryption key forms a pair corresponding to a decryption key to be disclosed at a disclosure time in said key controlling apparatus;

encrypting data by using said encryption key acquired in said acquiring step; and forming encrypted information to be transmitted to an information decrypting apparatus for decrypting information by adding data representing a time, at which secrecy protection of said encrypted data is to be ended, to said data encrypted in said encrypting step.

17. A recording medium for storing a first program for decrypting information, wherein said first program when executed by a first information processing apparatus causes said first information processing apparatus to perform the steps of:

extracting data representing a time, at which secrecy protection of encrypted data produced by a second information processing apparatus executing a second program for encrypting information is to be ended, from encrypted information formed by said second information processing apparatus executing said second program;

acquiring a decryption key disclosed by a third information processing apparatus executing a third program for disclosing decryption keys as a current time becomes coincident with a disclosure time indicated by data representing a disclosure date extracted in said extracting step; and decrypting said encrypted data produced by said second information processing apparatus executing said second program by using said decryption key acquired in said acquiring step.

18. A key managing system comprising:

an information encrypting apparatus for encrypting information by using encryption keys;

an information decrypting apparatus for decrypting information by using decryption keys;

a key controlling apparatus for controlling said encryption keys and said decryption keys used in said information encrypting apparatus and said information decrypting apparatus respectively; and a communication network connected at least between said information encrypting apparatus and said key controlling apparatus, wherein said key controlling apparatus stores at least a pair of said encryption and decryption keys and a key control table indicating a relation between said decryption keys and disclosure times of said decryption keys transmits an encryption key, in response to a request for a decryption key corresponding to a disclosure time, to said information encrypting apparatus through said communication network, and discloses a decryption key corresponding to a current time according to the relation indicated by said key control table;

wherein said information encrypting apparatus encrypts data using said encryption key from said key controlling apparatus and forms encrypted information to be transmitted to said information decrypting apparatus by adding data representing a time at which secrecy protection of said encrypted data is to be ended, to said encrypted data; and wherein said information decrypting apparatus receives said encrypted information formed by said information encrypting apparatus, acquires a decryption key disclosed by said key controlling apparatus at a disclosure time indicated by the data representing a disclosure time included in said encrypted information and decrypts said encrypted data included in said encrypted information using said decryption key.

19. A key managing system according to claim 18, wherein a plurality of said information decrypting apparatuses are included in said key managing system;

wherein said information decrypting apparatuses are all connected to said key controlling apparatus by said communication network; and wherein said key controlling apparatus, distributes any of said decryption keys to said information decrypting apparatuses by simultaneously broadcasting though said communication network a broadcast packet or a multi-cast packet.

20. A key managing system according to claim 13, wherein a plurality of said information decrypting apparatuses are included in said key managing system; and wherein said key controlling apparatus, discloses any of said decryption keys to said information decrypting apparatuses by radio broadcasting.

21. A key managing system according to claim 18, wherein said key-controlling apparatus comprises:

key generating means which is used for generating a new pair of encryption and decryption keys when a decryption key corresponding to a disclosure time specified by said information encrypting apparatus is not found in said key control table; and a control table creating means for adding said new pair of encryption and decryption keys generated by said key generating means and said disclosure time specified by said information encrypting apparatus, for which said new pair of encryption and decryption keys is generated by said key generating means, to said key control table.

22. A key managing system according to claim 19, wherein said key controlling apparatus comprises:

key generating means which is used for generating a new pair of encryption and decryption keys when a decryption key corresponding to a disclosure time specified by said information encrypting apparatus is not found in said key control table; and a control table creating means for adding said new pair of encryption and decryption keys generated by said key generating means and said disclosure time specified by said information encrypting apparatus, for which said new pair of encryption and decryption keys is generated by said key generating means, to said key control table.

23. A key managing system according to claim 20, wherein said key controlling apparatus comprises:

a key generating means which is used for generating a new pair of encryption and decryption keys when a decryption key corresponding to a disclosure time specified by said information encrypting apparatus is not found in said key control table; and a control table creating means for adding said new pair of encryption and decryption keys generated by said key generating means and said disclosure time specified by said information encrypting apparatus, for which said new pair of encryption and decryption keys is generated by said key generating means, to said key control table.

24. A key managing system according to claim 18, wherein said information encrypting apparatus encrypts data to be transmitted by using a data key to produce encrypted data and, at the same time, double-encrypts said data key by using an individual encryption key entered by an operator and an encryption key from said key controlling apparatus to produce a double encrypted data key;

wherein said information encrypting apparatus forms encrypted information to be transmitted to said information decrypting apparatus by adding information on a time, at which said encrypted data produced by said information encrypting apparatus is to be decrypted, and said double encrypted data key to said encrypted data; and wherein said information decrypting means decrypts said double encrypted data key included in said encrypted information by using an individual encryption key entered by an operator and said decryption key and, at the same time, decrypts said encrypted data included in said encrypted information by using said data key.

25. A key managing system according to claim 19, wherein said information encrypting apparatus encrypts data to be transmitted by using a data key to produce encrypted data and, at the same time, double-encrypts said data key by using an individual encryption key entered by an operator and an encryption key from said key controlling apparatuses to produce a double encrypted data key;

wherein said information encrypting apparatus forms encrypted information to be transmitted to said information decrypting apparatus by adding information on a time, at which said encrypted data produced by said information encrypting apparatus is to be decrypted, and said double encrypted data key to said encrypted data; and wherein said information decrypting means decrypts said double encrypted data key included in said encrypted information by using an individual encryption key entered by an operator and said decryption key and, at the same time, decrypts said encrypted data included in said encrypted information by using said data key.

26. A key managing system according to claim 20, wherein said information encrypting apparatus encrypts data to be transmitted by using a data key to produce encrypted data and, at the same time, double-encrypts said data key by using an individual encryption key entered by an operator and an encryption key from said key controlling apparatuses to produce a double encrypted data key;

wherein said information encrypting apparatus forms encrypted information to be transmitted to said information decrypting apparatus by adding information on a time, at which said encrypted data produced by said information encrypting apparatus is to be decrypted, and said double encrypted data key to said encrypted data; and wherein said information decrypting means decrypts said double encrypted data key included in said encrypted information by using an individual encryption key entered by an operator and said decryption key and, at the same time, decrypts said encrypted data included in said encrypted information by using said data key.

27. A key managing system according to claim 21, wherein said information encrypting apparatus encrypts data to be transmitted by using a data key to produce encrypted data and, at the same time, double-encrypts said data key by using an individual encryption key entered by an operator and an encryption key from said key controlling apparatuses to produce a double encrypted data key;

wherein said information encrypting apparatus forms encrypted information to be transmitted to said information decrypting apparatus by adding information on a time, at which said encrypted data produced by said information encrypting apparatus is to be decrypted, and said double encrypted data key to said encrypted data; and wherein said information decrypting means decrypts said double encrypted data key included in said encrypted information by using an individual encryption key entered by an operator and said decryption key and, at the same time, decrypts said encrypted data included in said encrypted information by using said data key.

28. A key managing system according to claim 18, wherein said information encrypting apparatus and said information decrypting apparatus are connected to each other by said communication network; and wherein said information encrypting apparatus comprises:
an encrypted information transmitting means for transmitting encrypted information to said information decrypting apparatus by said communication network.

29. A key managing system according to claim 1, further comprising:

an information encrypting apparatus for encrypting information by using encryption keys;

wherein said key controlling apparatus controls publicity of said encryption keys used in said information encrypting apparatus;

wherein said communication network is coupled between said information decrypting apparatus, said information encrypting apparatus and said key controlling apparatus;

wherein said key storage stores at least a pair of said encryption and decryption keys;

wherein said key controlling apparatus further comprises:
an encryption key transmitting apparatus for transmitting an encryption key resulting from the search performed by said key searching means to said information encryption apparatus through said communication network;

wherein said information encrypting apparatus comprising:
timing information transmitting means for transmitting data representing a time at which security protection data to be encrypted will be ended to said key controlling apparatus through said communication network;

encrypting key acquiring means for acquiring an encryption key which is transmitted by said key controlling apparatus through said communication network and forms a pair in conjunction with a decryption key associated with a disclosure time indicated by the data representing a disclosure transmitted by said time information transmitting means, data encrypting means for encrypting data using said encryption key acquired by said encryption key acquiring means, and encrypted information forming means for forming encrypted information to be transmitted to said information decryption apparatus by adding said data representing a time, at which secrecy protection of said encrypted data is to be ended, to said data encrypted by said data encrypting means.

* * * * *